(12) United States Patent
Kitamura et al.

(10) Patent No.: US 10,052,727 B2
(45) Date of Patent: Aug. 21, 2018

(54) PRESS-FITTING DEVICE

(71) Applicant: TOYOTA JIDOSHA KABUSHIKI KAISHA, Toyota-shi (JP)

(72) Inventors: Takahiro Kitamura, Anjo (JP); Koichi Sugiura, Toyota (JP); Kenji Harada, Miyoshi (JP); Takahiro Akimoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 409 days.

(21) Appl. No.: 14/845,866

(22) Filed: Sep. 4, 2015

(65) Prior Publication Data

US 2016/0067838 A1    Mar. 10, 2016

(30) Foreign Application Priority Data

Sep. 9, 2014  (JP) .................................. 2014-183724

(51) Int. Cl.
*B23P 19/02*  (2006.01)
(52) U.S. Cl.
CPC .................................... *B23P 19/02* (2013.01)
(58) Field of Classification Search
None
See application file for complete search history.

(56) References Cited

U.S. PATENT DOCUMENTS

| | | | |
|---|---|---|---|
| 5,850,687 A * | 12/1998 | Ito ........................... | B23P 19/02 29/243.5 |
| 6,076,254 A * | 6/2000 | Onodera ............... | B23P 19/006 29/447 |
| 2013/0152368 A1* | 6/2013 | Kokubo ................. | B23P 11/00 29/447 |
| 2014/0157857 A1* | 6/2014 | Breen .................... | B21D 28/34 72/404 |

FOREIGN PATENT DOCUMENTS

| | | |
|---|---|---|
| JP | 61-249288 | 11/1986 |
| JP | 2-71937 | 3/1990 |
| JP | 4-183535 A | 6/1992 |
| JP | 9-277122 A | 10/1997 |
| JP | 2001-300027 | 10/2001 |
| JP | 2012-166288 | 9/2012 |
| JP | 2014-30879 | 2/2014 |

\* cited by examiner

*Primary Examiner* — Jacob Cigna
(74) *Attorney, Agent, or Firm* — Oblon, McClelland, Maier & Neustadt, L.L.P.

(57) ABSTRACT

A press-fitting device includes: a workpiece holding portion; a one-side pressing unit configured to press either one of a press-fitting tool and a backup tool against a workpiece in a first direction while performing three dimensional position adjustment thereon; an other-side pressing unit configured to press the other one of the press-fitting tool and the backup tool which is not pressed by the one-side pressing unit, against the workpiece in a second direction opposite to the first direction, while performing three dimensional position adjustment thereon; and a press-fitting controlling portion configured to control stroke amounts of the tools in a (Continued)

press-fitting direction at the time of a press-fitting operation. The press-fitting controlling portion includes a stroke manipulating portion; a displacement data storing portion; and a stroke correction portion.

6 Claims, 20 Drawing Sheets

F I G . 13
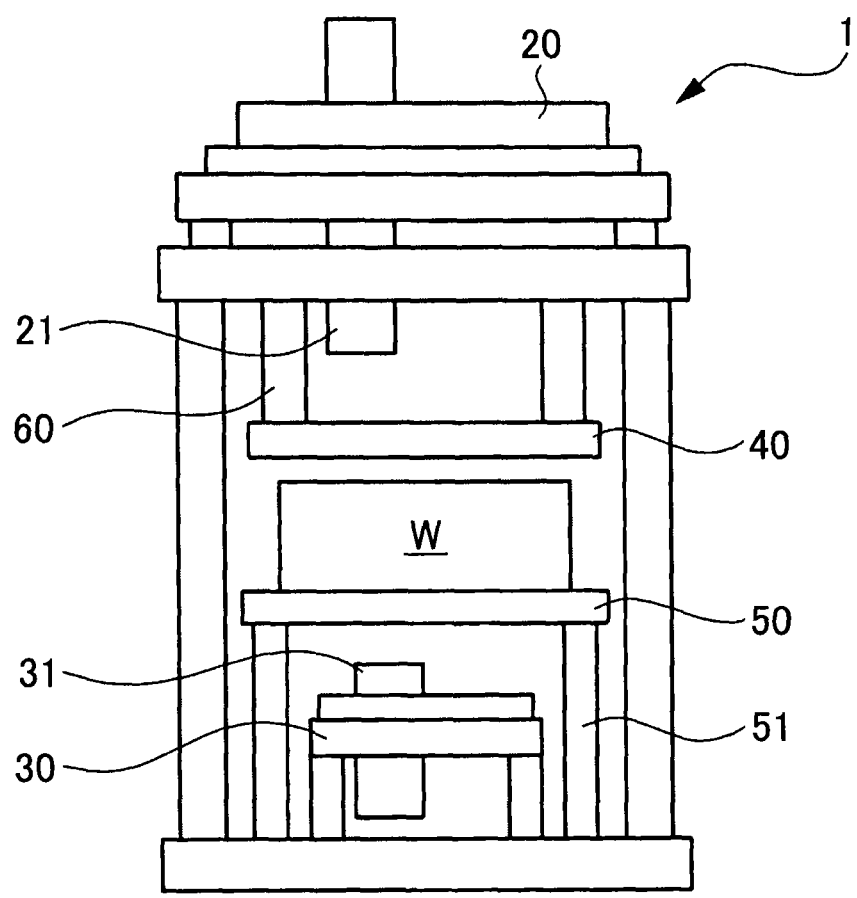

PRESS-FITTING DEVICE

INCORPORATION BY REFERENCE

The disclosure of Japanese Patent Application No. 2014-183724 filed on Sep. 9, 2014 including the specification, drawings and abstract is incorporated herein by reference in its entirety.

BACKGROUND OF THE INVENTION

1. Field of the Invention

The present invention relates to a press-fitting device configured to perform a press-fitting operation to press a press-fitting component (e.g., a bearing) onto a press-fitting object (e.g., a major component of a transmission) so as to assemble the press-fitting component with the press-fitting object. More specifically, the present invention relates to a press-fitting device configured to perform a control with a more accurate stroke amount of a tool at the time of a press-fitting operation, or a press-fitting device that is configured such that a tool corresponding to a type of a press-fitted object can be easily replaced, so that the press-fitting device has high application performance with respect to various types of products.

2. Description of Related Art

A press-fitting device for assembling a small component (a press-fitting component) to a large component (a press-fitting object) is used. As a press-fitting device in the related art, there is a press-fitting device described in Japanese Patent Application Publication No. 2-71937 (JP 2-71937 A). The press-fitting device described in the above publication is a device for pressing a plurality of press-fitting materials (press-fitting components) onto a press-fitted material (a press-fitting object) at the same time. Accordingly, the device is provided with a plurality of sets of a press-fitting punch and a receiving member. Further, the press-fitted material is sandwiched between upper and lower intermediate plates.

However, in the technique of the related art, first, there is a possibility that accuracy of a press-fitting stroke is not sufficient. This is because a large compressive load is applied at the time of a press-fitting operation and therefore bending of a member of each part of the press-fitting device cannot be ignored. Because of this, there is a possibility that the component thus press-fitted may not reach a proper press-fitting depth precisely. Of course, a possibly high-rigidity material is used as a constituent member of the press-fitting device, but a perfectly rigid body does not exist. Further, it is possible to reduce the bending by use of a high-rigid constituent member, but this cannot avoid upsizing of the device and an increase in weight.

Further, there is a possibility that a press-fitting device may be designed for exclusive use per type of a press-fitting object. The reason is as follows: a press-fitting position and a type of a press-fitting component vary depending on a type of a press-fitting object, so it is necessary to place a press-fitting punch or the like according to the type of the press-fitting object. That is, versatility is lacked.

SUMMARY OF THE INVENTION

The present invention provides a press-fitting device that achieves securing of accuracy of a press-fitting stroke. Further, the present invention provides a press-fitting device having versatility with respect to various types of press-fitting objects.

A press-fitting device according to one aspect of the present invention includes: a workpiece holding portion configured to hold a workpiece as a press-fitting object; a one-side pressing unit configured to press, in a first direction against the workpiece held by the workpiece holding portion, either one of a press-fitting tool configured to press a press-fitting component onto the workpiece and a backup tool configured to restrain a position change of the workpiece during a press-fitting operation, the one-side pressing unit being also configured to adjust a three-dimensional position of the either one of the press-fitting tool and the backup tool; an other-side pressing unit configured to press the other one of the press-fitting tool and the backup tool which is not pressed by the one-side pressing unit, against the workpiece held by the workpiece holding portion in a second direction opposite to the first direction that is a pressing direction of the one-side pressing unit, the other-side pressing unit being also configured to adjust a three-dimensional position of the other one of the press-fitting tool and the backup tool; and a press-fitting controlling portion configured to control stroke amounts of the press-fitting tool and the backup tool in a press-fitting direction at the time of a press-fitting operation by the one-side pressing unit and the other-side pressing unit. The press-fitting controlling portion is characterized by including: a stroke-amount manipulating portion configured to manipulate the stroke amounts of the press-fitting tool and the backup tool in the press-fitting direction, the stroke-amount manipulating portion being configured to manipulate current values of the stroke amounts so as to accord with necessary values of the stroke amounts according to a result of comparison of the current values of the stroke amounts with the necessary values of the stroke amounts; a displacement amount output portion configured to output displacement amounts of the one-side pressing unit and the other-side pressing unit in the press-fitting direction, at the time of the press-fitting operation; and a correction portion configured to correct, based on the displacement amounts thus output from the displacement amount output portion, at least one of the current values of the stroke amounts and the necessary values of the stroke amounts to be compared in the stroke-amount manipulating portion in terms of the stroke amounts of the press-fitting tool and the backup tool in the press-fitting direction.

In the press-fitting device according to the above aspect, the one-side pressing unit presses either one of the press-fitting tool and the backup tool against the workpiece held by the workpiece holding portion in the first direction while performing three dimensional position adjustment thereon. Further, the other-side pressing unit presses the other one of the press-fitting tool and the backup tool which is not pressed by the one-side pressing unit, in the second direction opposite to the first direction, while a three dimensional position thereof is adjusted. In this state, a load is applied so as to perform press-fitting. The stroke amounts of the press-fitting tool and the backup tool in the press-fitting direction at the time of this press-fitting operation are controlled by the press-fitting controlling portion. More specifically, in terms of the stroke amounts of the press-fitting tool and the backup tool in the press-fitting direction, the stroke-amount manipulating portion determines an increase or a decrease of a load in the press-fitting direction according to a result of the comparison of the current values of the stroke amounts with the necessary values of the stroke amounts, so that the current values of the stroke amounts accord with the necessary values of the stroke amounts. At this time, displacement amounts of the one-side pressing unit and the other-side pressing unit in the press-fitting direction at the time of the press-fitting operation are output by the displacement amount output portion. In response to this, the correction portion corrects, based on the displacement amounts thus output, at least one of the current values of the stroke amounts and the necessary values of the stroke amounts. The comparison in the stroke-amount manipulating portion is performed on the values thus corrected. Hereby, press-fitting is performed appropriately. Note that the stroke-amount manipulating portion can manipulate the stroke amounts by determining an increase and a decrease of the load in the press-fitting direction according to the result of the comparison of the current values of the stroke amounts with the necessary values of the stroke amounts, for example.

Here, the displacement amount output portion may store therein the displacement amounts found in advance per press-fitting position and per load value in the press-fitting direction, and output a corresponding displacement amount based on information of a press-fitting position and information of a current load value. Hereby, appropriate correction is performed by an appropriate displacement amount according to the press-fitting position and the current value of the load.

Moreover, the press-fitting device may include: a one-side inner plate making contact with the workpiece from a side of the one-side pressing unit so as to serve as the workpiece holding portion; an other-side inner plate making contact with the workpiece from a side of the other-side pressing unit so as to serve as the workpiece holding portion; and an attitude controlling portion including a plurality of extendable members placed in parallel with each other, so as to prevent inclination of at least one of the one-side inner plate and the other-side inner plate. Hereby, even in a case of offset press-fitting in which the backup tool cannot be pressed right in back of the press-fitting position because of some circumstances of the workpiece, it is possible to prevent inclination of the workpiece and to perform appropriate press-fitting.

The press-fitting device according to the above aspect may further include a storing portion configured to store a plurality of press-fitting tools or the backup tool to be used by the one-side pressing unit or the other-side pressing unit. In this case, each of the one-side pressing unit and the other-side pressing unit may include an adapter configured to grip the press-fitting tool or the backup tool. Each of the press-fitting tool and the backup tool may include: a locking member configured to take a retracting position that allows movement of the adapter between a non-grip position and a grip position, and a projection position that does not allow the movement of the adapter between the non-grip position and the grip position; an inside member including an inside recessed portion that allows the locking member to be positioned at the retracting position, and a large diameter portion that does not allow the locking member to be positioned at the retracting position; and a biasing member configured to bias the inside member so that the large diameter portion faces the locking member. The storing portion may have a push-back shape so as to push back the inside member of the press-fitting tool or the backup tool stored therein, against the biasing of the biasing member so that the inside recessed portion faces the locking member, and the storing portion, the press-fitting tool, and the backup tool may form a prohibition shape that prohibits the press-fitting tool or the backup tool stored in the storing portion from moving in a biased direction by the biasing member.

In the press-fitting device according to the above aspect, the one-side pressing unit and the other-side pressing unit can appropriately select and grip the press-fitting tool and the backup tool stored in the storing portion according to the specification of the workpiece, so as to provide the selected one to the press-fitting operation. In this case, in each of the press-fitting tool and the backup tool gripped by the one-side pressing unit and the other-side pressing unit, the biasing member biases the inside member so that the adapter is placed at the grip position, and the locking member is placed at the projection position. On this account, the lock member prohibits the adapter from being placed at the non-grip position relative to the press-fitting tool or the backup tool. That is, the press-fitting tool or the backup tool is prevented from falling off from the adapter. In the meantime, in the press-fitting tool or the backup tool stored in the storing portion, the inside member is pushed back by the pushing-back shape of the storing portion, so that the locking member can retract to the retracting position. Hereby, the adapter can move between the non-grip position and the grip position relative to the press-fitting tool or the backup tool. In this state, the movement of the press-fitting tool or the backup tool itself by the biasing member in the biasing direction is prohibited by the prohibition shape formed by the storing portion, the press-fitting tool, and the backup tool. This accordingly realizes a press-fitting device having high versatility.

According to the configuration, a press-fitting device that achieves securing of accuracy of a press-fitting stroke is provided. Further, it is possible to provide a press-fitting device having versatility with respect to various types of press-fitting objects.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a front view diagrammatically illustrating the press-fitting device that is receiving a workpiece;

DETAILED DESCRIPTION OF EMBODIMENTS

Figure 1:
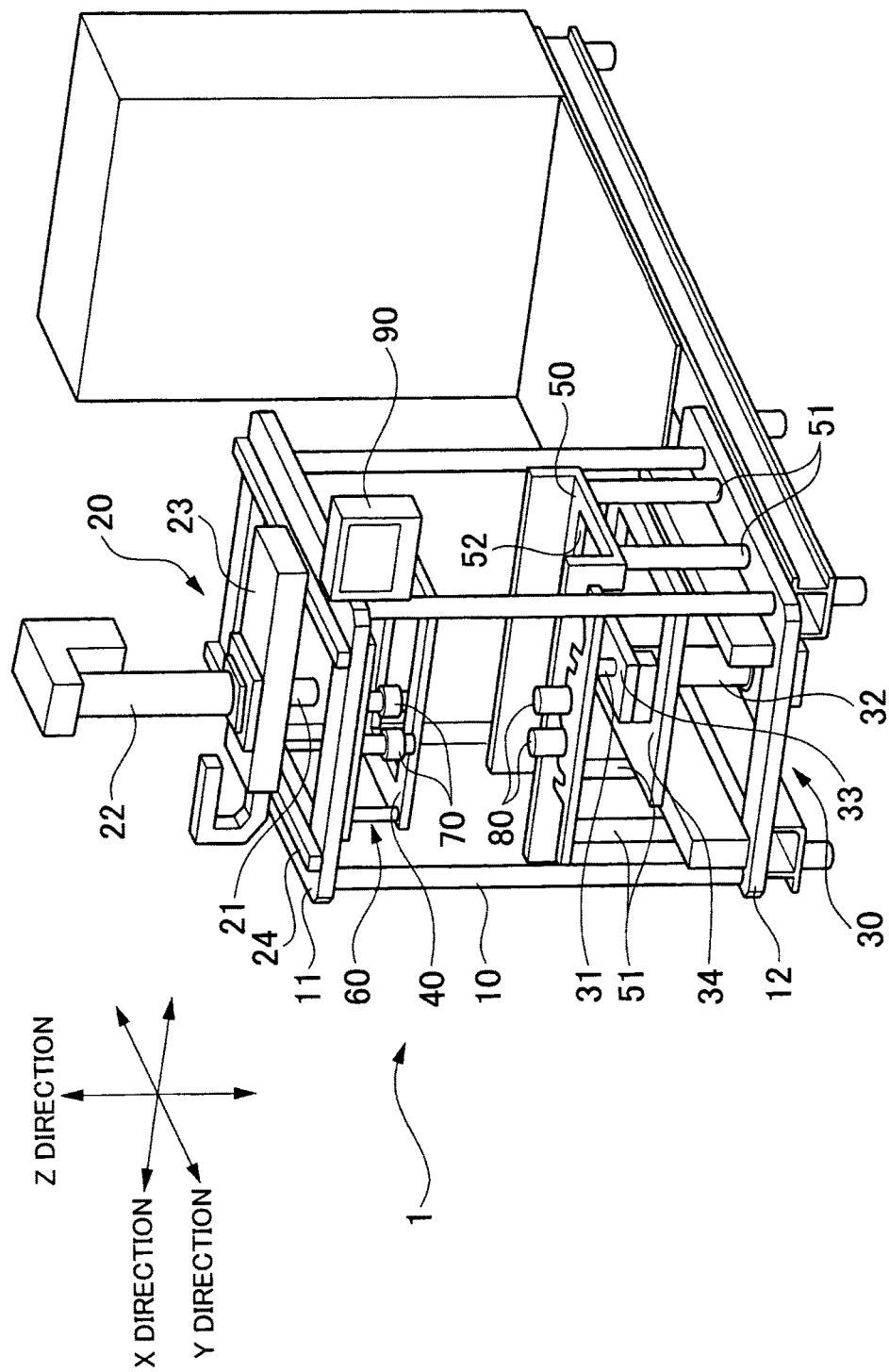
FIG. 1 is a perspective view illustrating a general schematic configuration of a press-fitting device according to the present embodiment.

The following describes an embodiment for embodying the present invention in detail with reference to the attached drawings. The present embodiment is obtained by applying the present invention to a press-fitting device 1 illustrated in FIG. 1. The press-fitting device 1 of FIG. 1 is configured such that an upper unit 20 and a lower unit 30 are attached to a frame 10 having a generally rectangular-solid shape as a whole. The press-fitting device 1 further includes an upper inner plate 40 and a lower inner plate 50. Hereby, the press-fitting device 1 presses a press-fitting component onto a workpiece with the upper unit 20 and the lower unit 30 in a state where the workpiece, as a press-fitting object, is held by being sandwiched between the upper inner plate 40 and the lower inner plate 50.

The press-fitting device 1 can freely perform downward press-fitting and upward press-fitting. The downward press-fitting is performed by pressing the press-fitting component onto the workpiece with the upper unit 20 while backing up the workpiece with the lower unit 30. The upward press-fitting is performed by pressing the press-fitting component onto the workpiece with the lower unit 30 while backing up the workpiece with the upper unit 20 in an upside-down manner to the above. Further, the press-fitting device 1 is provided with a controlling portion 90. An input operation by an operator and a display to the operator are also performed with the controlling portion 90.

The upper unit 20 is a unit for positioning an upper tool attaching portion 21 so as to press the upper tool attaching portion 21 against the workpiece from an upper side to a lower side. For this purpose, the upper unit 20 includes an upper Z-axis robot 22, an upper XY-axis robot 23, and an upper Y-axis rail 24. The upper Z-axis robot 22 moves the upper tool attaching portion 21 in an up-down direction (a Z-axis direction), and includes a press servomechanism. Further, the upper Z-axis robot 22 can read a moving amount (a stroke amount). The upper Z-axis robot 22 is provided in the upper XY-axis robot 23. The upper XY-axis robot 23 moves over the upper Y-axis rail 24 in a depth direction (a Y-axis direction) in FIG. 1, and moves the upper Z-axis robot 22 provided therein in a right-left direction (an X-axis direction) in FIG. 1.

The lower unit 30 is a unit for positioning a lower tool attaching portion 31 so as to press the lower tool attaching portion 31 against the workpiece from a lower side to an upper side. For this purpose, the lower unit 30 includes a lower Z-axis robot 32, a lower XY-axis robot 33, and a lower X-axis rail 34, similarly to the upper unit 20. The lower Z-axis robot 32 is provided with a press servomechanism.

The upper inner plate 40 is attached to a lower side of an upper member 11, which is a part of the frame 10, via an attitude control device 60. The attitude control device 60 is described with reference to FIG. 2. The attitude control device 60 is configured such that the upper inner plate 40 is suspended by four floatings 61 placed in parallel. Each of the floatings 61 has an extendable double-pipe structure, so as to be individually extended and contracted by the controlling portion 90. The attitude control device 60 further includes height meters 62 placed at both ends in the X-axis direction. Respective heights of the upper inner plate 40 which are measured at respective positions of two height meters 62 are notified to the controlling portion 90. Hereby, the controlling portion 90 controls an extended state of each of the floatings 61 so that the upper inner plate 40 levels off. Note that two more height meters 62 may be further provided at both end positions in the Y-direction, so that four height meters 62 are provided in total.

Figure 2:
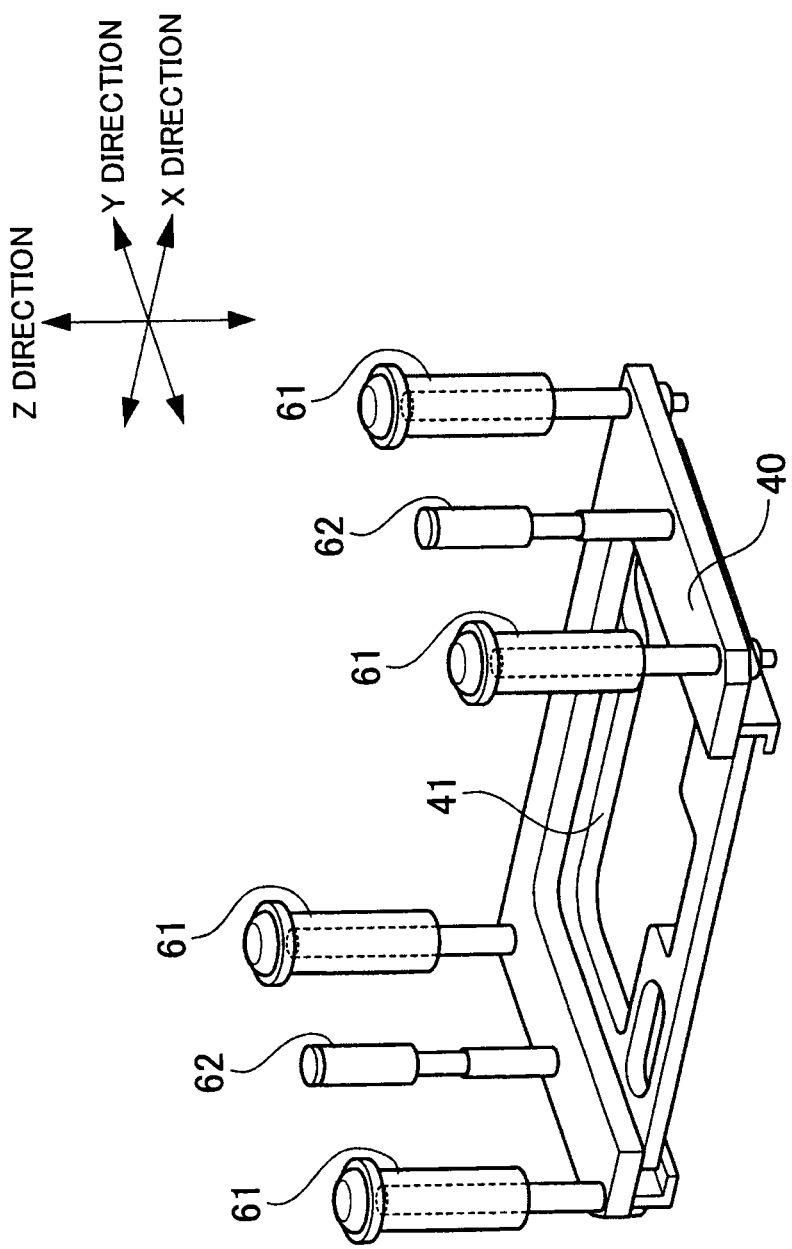
FIG. 2 is a perspective view illustrating a configuration of an attitude control device, which is a part of the press-fitting device of FIG. 1.

As can be seen from FIG. 2, the upper inner plate 40 has a shape in which a large window 41 is formed at a central part. The reason why the upper inner plate 40 has the window 41 is that processing on the workpiece by the upper unit 20 (press-fitting of the press-fitting component) can be performed while the workpiece is pressed by the upper inner plate 40.

Further, referring back to FIG. 1, the lower inner plate 50 is provided so as to be movable up and down. In view of this, a lifter 51 for moving up and down the lower inner plate 50 is provided between the lower inner plate 50 and a lower member 12, which is a part of the frame 10. Moving up and down of the lower inner plate 50 by the lifter 51 is also performed by the controlling portion 90. Further, similarly to the upper inner plate 40, the lower inner plate 50 has a shape in which a large window 52 is formed at a central part. This is because processing on the workpiece by the lower unit 30 (press-fitting of the press-fitting component) can be performed while the workpiece is sandwiched between the lower inner plate 50 and the upper inner plate 40.

With such an overall configuration, in the press-fitting device 1, the lower inner plate 50 on which the workpiece is placed is pushed up by the lifter 51 until the workpiece makes contact with the upper inner plate 40. Thus, the workpiece is fixed by being sandwiched between the upper inner plate 40 and the lower inner plate 50. In this state, a press-fitting operation with the upper unit 20 and the lower unit 30 is performed. At the time of the press-fitting operation, the upper inner plate 40 is kept horizontal by the attitude control device 60. This prevents the workpiece from being inclined.

The press-fitting device 1 in FIG. 1 further includes an upper tool group 70 and a lower tool group 80. The upper tool group 70 includes tools attached to the upper tool attaching portion 21 of the upper unit 20. The lower tool group 80 includes tools attached to the lower tool attaching portion 31 of the lower unit 30. The tools include press-fitting tools for performing press-fitting on various types of press-fitting components, and a backup tool for pressing a workpiece from its back side at the time of press-fitting.

Figure 3:
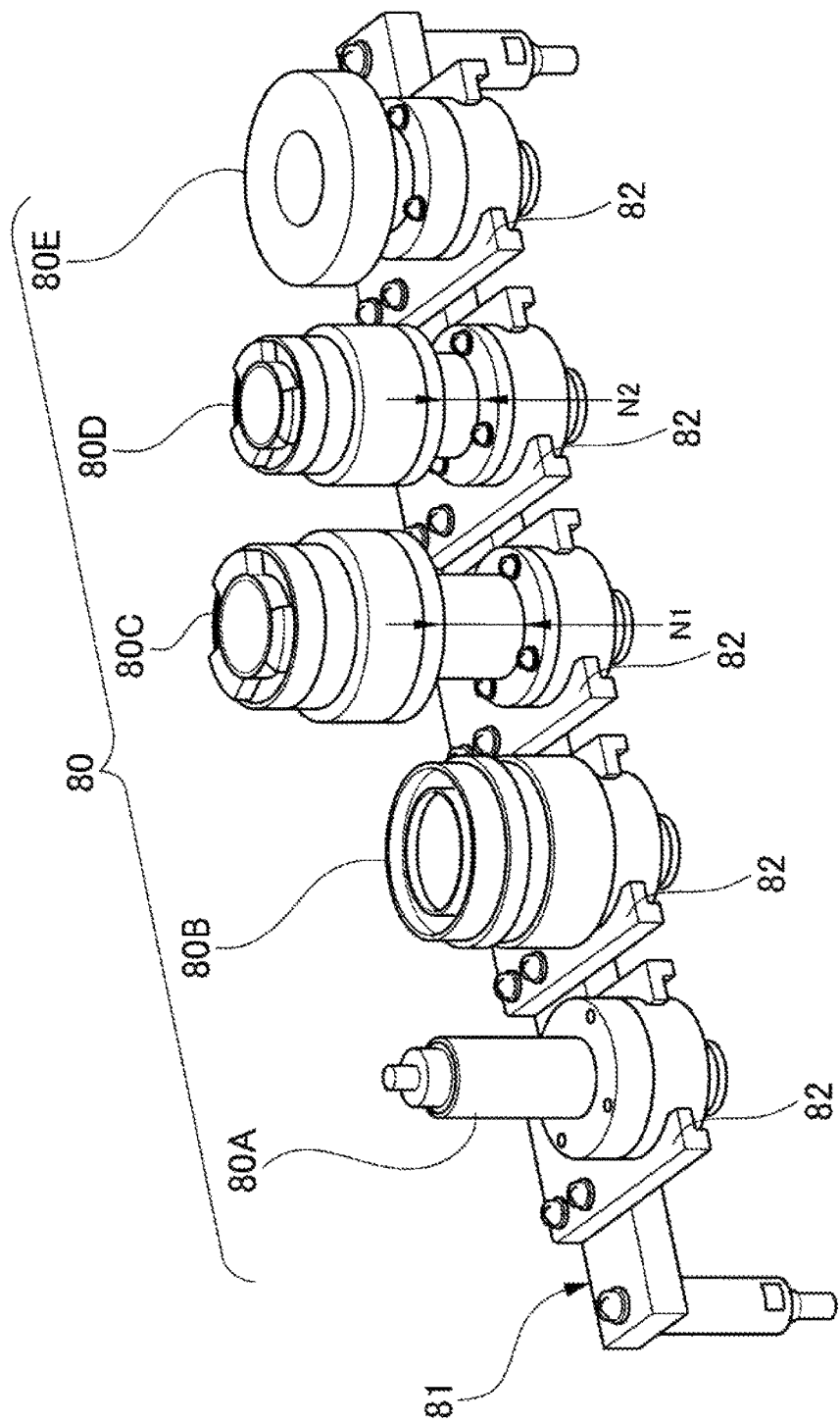
FIG. 3 is a perspective view of a lower tool group held by a lower tool parking.

Each of the tools of the lower tool group 80 is held by a lower tool parking 81, as illustrated in FIG. 3. Among the tools illustrated in FIG. 3, tools 80A to 80D are press-fitting tools used at the time of upward press-fitting. The tools 80A to 80D have different shapes of respective tip ends (ends facing an upper side in FIG. 3) for respective types of target press-fitting components. Further, a neck length (N1, N2) varies depending on a depth-direction position of the workpiece at a target press-fitting part. A tool 80E is a backup tool to be used at the time of downward press-fitting, that is, at the time of press-fitting in which the lower unit 30 is a backup side. In any of the tools 80A to 80E, a downward end part in FIG. 3 is a base end gripped by the lower tool attaching portion 31 of the lower unit 30.

Figure 4:
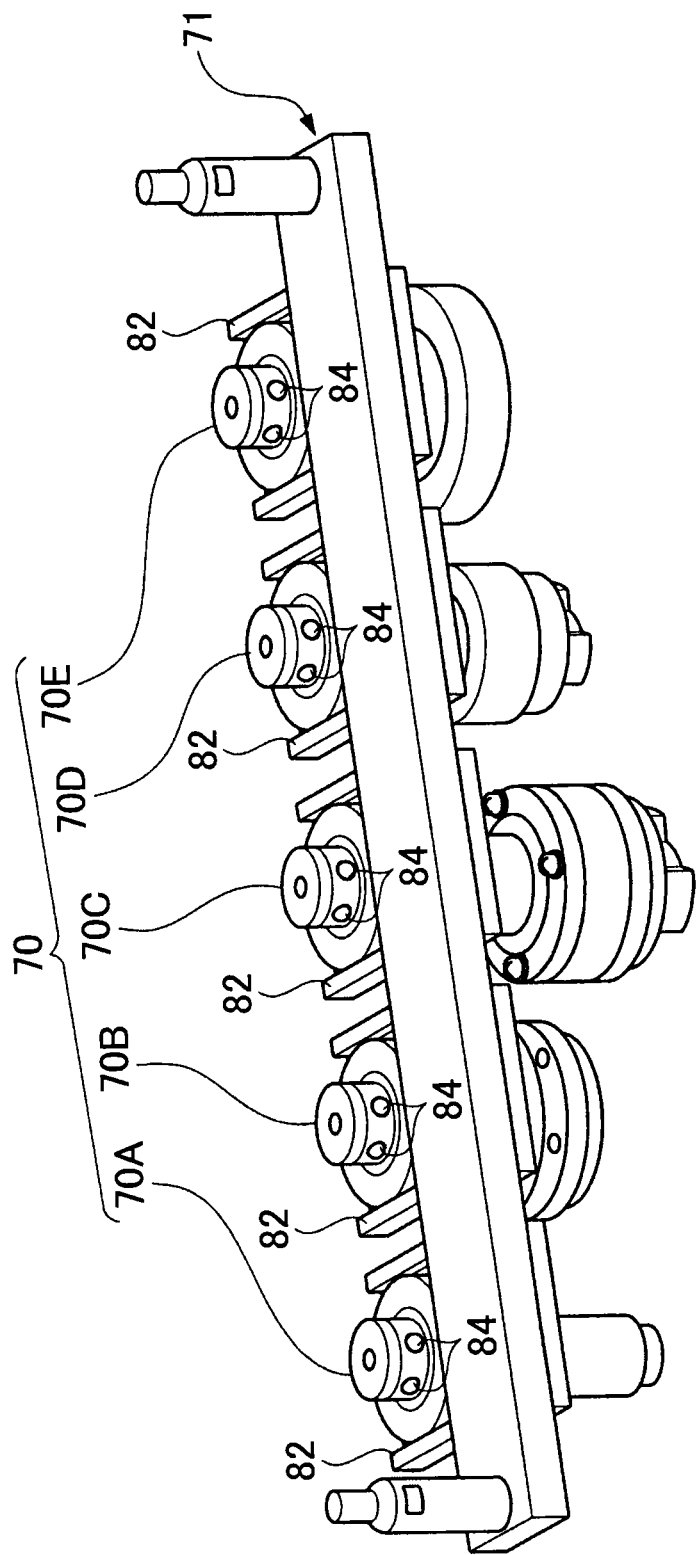
FIG. 4 is a perspective view of an upper tool group held by an upper tool parking.

Further, similarly to the above, the upper tool group 70 is also held by an upper tool parking 71 (FIG. 4). Note that tools 70A to 70E of the upper tool group 70 are held in an upside-down manner to the above such that their tip ends (end parts to which a press-fitting component is attached) face a lower side and their base ends face an upper side.

A plurality of forks 82 is provided in each of the lower tool parking 81 and the upper tool parking 71 (FIG. 3, FIG. 4). Each of the forks 82 holds one tool 70, 80. Each of the lower tool parking 81 and the upper tool parking 71 is attached to the frame 10 in a fixed manner.

Next will be described a tool holding mechanism by the fork 82 in the lower tool parking 81 and the upper tool parking 71. Of course, each of the forks 82 holds each tool 70, 80 so as not to cause the each tool 70, 80 to fall off by itself. In the meantime, it is also possible to smoothly take out the tool 70, 80 from the fork 82 and return it to the fork 82 by the upper tool attaching portion 21 or the lower tool attaching portion 31 without difficulty.

Figure 5:
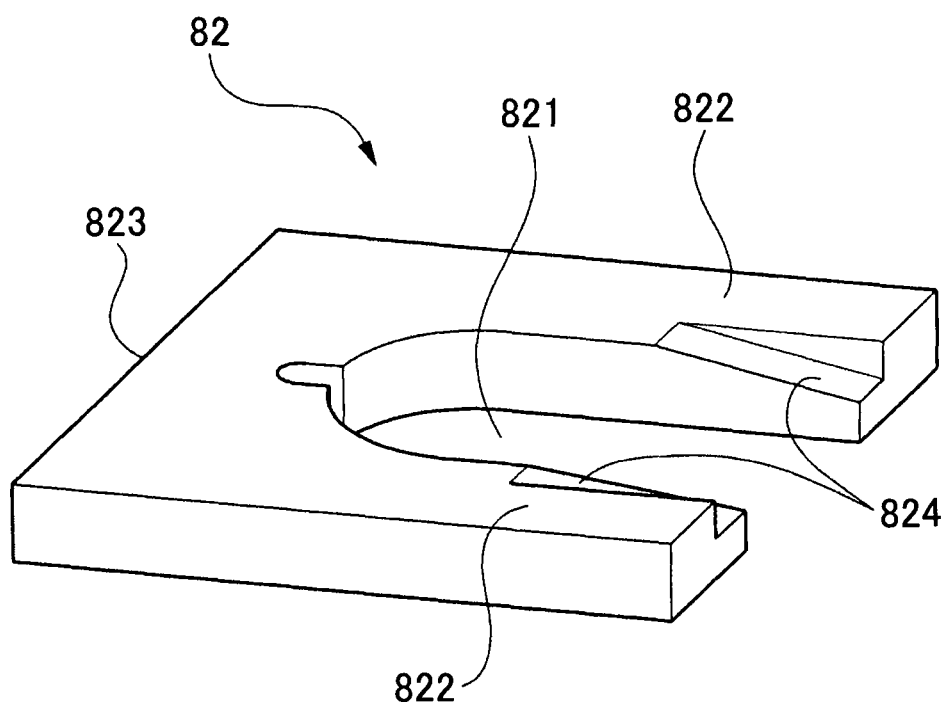
FIG. 5 is a perspective view separately illustrating a fork.

Initially described is the fork 82. FIG. 5 is a perspective view separately illustrating the fork 82. The fork 82 is a quadrangular flat-shaped member as a whole, and has a deep recessed portion 821 formed in one side thereof. Nail portions 822 are formed on both sides of the recessed portion 821. It is needless to say that the recessed portion 821 between two nail portions 822 is a part for holding the tool 70, 80. Further, that side 823 of the fork 82 which is opposite to a side where the recessed portion 821 is formed is attached to the lower tool parking 81 or the upper tool parking 71. A tapered portion 824 is formed on one surface side (an upper surface side in FIG. 5) of that part of each of the nail portions 822 which is placed on a recessed-portion-821 side, such that the tapered portion 824 is along the recessed portion 821. In the tapered portion 824, a thickness of the fork 82 becomes thinner as it extends from the side 823 to the tip of the nail portion 822.

In the lower tool parking 81, such a fork 82 is attached so that a surface where the tapered portion 824 is formed faces a lower side. On the other hand, in the upper tool parking 71, such a fork 82 is attached so that the tapered portion 824 faces an upper side. That is, the fork 82 is attached so that the tapered portion 824 faces a base end side (a side gripped by the tool attaching portion 21, 31) of the tool 70, 80 to be held.

Figure 6:
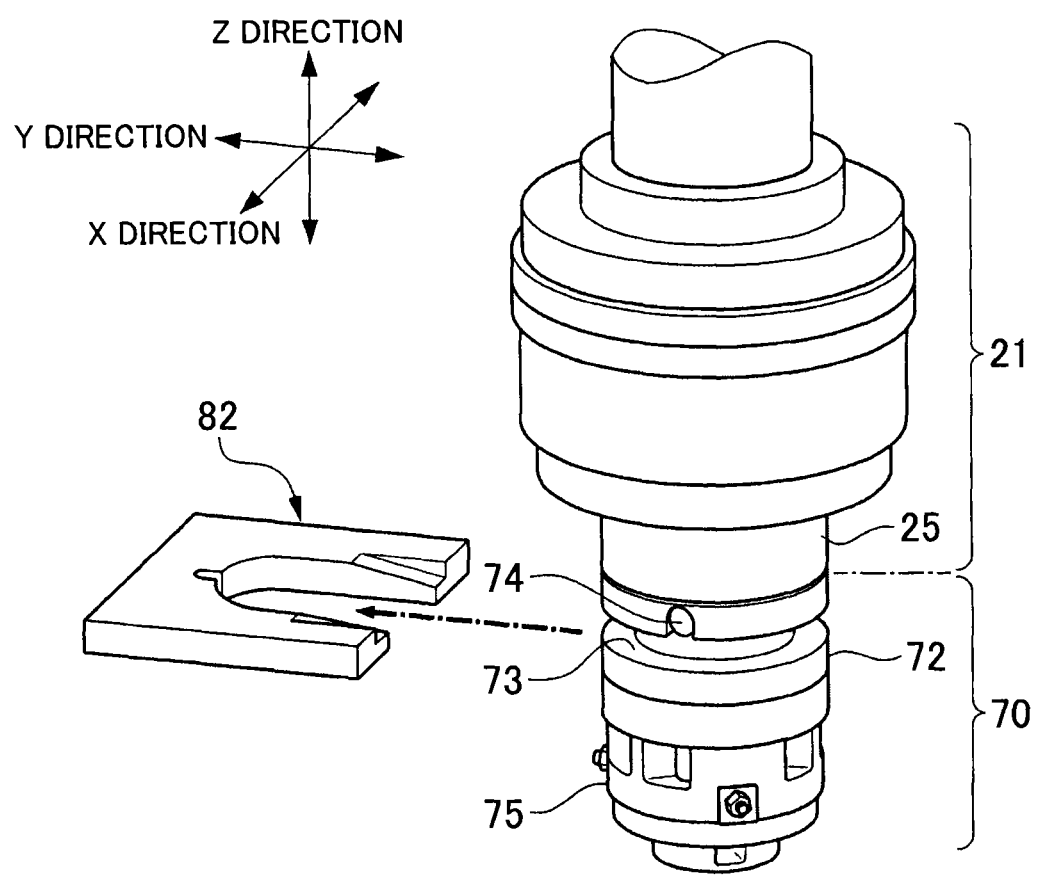
FIG. 6 is a perspective view illustrating a tool attaching portion, a tool, and the fork.

Next will be described an attachment structure of the tool 70, 80 to the fork 82. For this purpose, FIG. 6 is a perspective view of the tool 70 gripped by the upper tool attaching portion 21, and the fork 82. The upper tool attaching portion 21 moves in the Y-axis direction so as to take out the tool 70 from the fork 82 and return the tool 70 to the fork 82. Hereinafter, a tip portion of the upper tool attaching portion 21 is referred to as an adapter 25. The tool 70 is provided with a body portion 72 and a tip end 75. The tip end 75 is a portion that performs holding or the like on a press-fitting component. An actual shape of the tip end 75 varies depending on the tools 70A to 70E. Further, the fork 82 is attached to the upper tool parking 71 so that a thickness direction corresponds to a Z-direction, a projection direction of the nail portions 822 corresponds to a Y-direction, and a direction connecting two nail portions 822 corresponds to an X-direction.

The body portion 72 is a portion held by the fork 82. A configuration of the body portion 72 is common to the tools 70A to 70E. The body portion 72 has a generally columnar outer shape, and a groove 73 is formed on an outer surface thereof. The groove 73 has a shape to which the fork 82 fits. A width of the groove 73 is set according to a thickness of the fork 82. Further, a rod pin 74 is provided just above the groove 73 in the body portion 72. The rod pin 74 is provided on a back side in FIG. 6 in a similar manner. An axial direction of the rod pin 74 is a direction perpendicular to a height direction (the Z-direction) and a movement direction (the Y-direction) to the fork 82, namely, the X-direction. Although details thereof are described later, the rod pin 74 can move slightly in the Z-direction relative to the body portion 72. Note that FIG. 6 illustrates the upper tool attaching portion 21 and the tool 70, but the lower tool attaching portion 31 and the tool 80 have the same configuration in an upside-down manner to the above (in the Z-direction). In this case, the fork 82 is turned over so that the tapered portion 824 faces a lower side. The following deals with the tool 70 representatively in order to describe the tool 70 and the tool 80.

Figure 7:
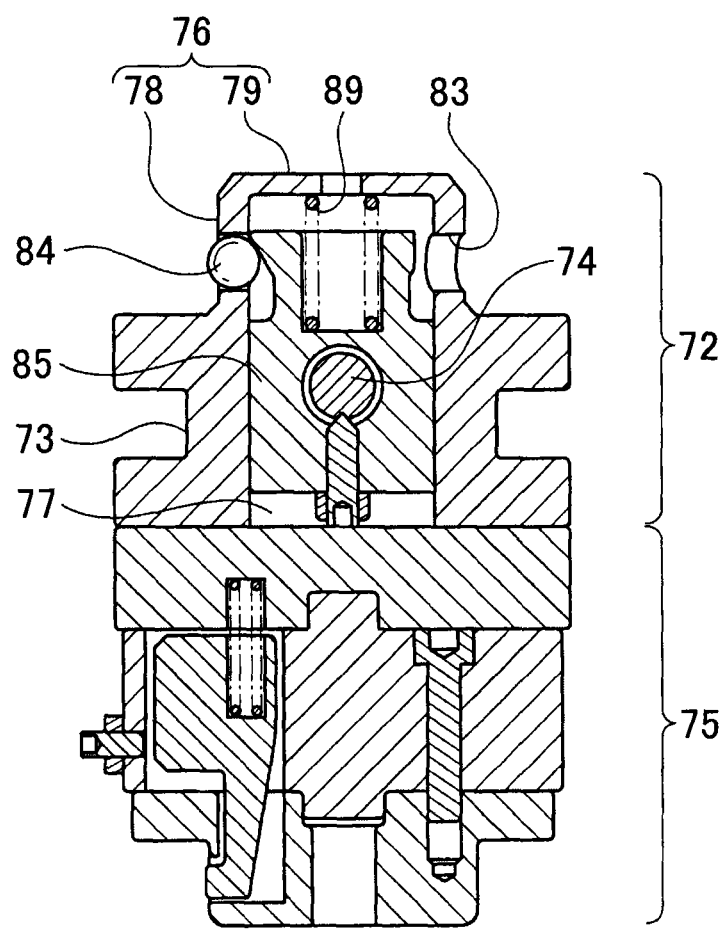
FIG. 7 is a sectional view of the tool.

FIG. 7 is a sectional view of the tool 70. Since the structure of the tip end 75 varies depending on a type of the tool 70 as described above, a cross section of the tip end 75 illustrated in FIG. 7 is an example. A small diameter portion 76 having a diameter smaller than the body portion 72 is formed in that end part (a base end) of the body portion 72 which is opposite to the tip end 75. Note that the small diameter portion 76 is not seen in FIG. 6 because the small diameter portion 76 is covered with the adapter 25.

A cylindrical internal space 77 is formed inside the body portion 72. The internal space 77 is formed so as to reach an inside of the small diameter portion 76. That is, the small diameter portion 76 is constituted by a cylindrical portion 78 having a cylindrical shape, and its cover portion 79. Through holes 83 penetrating from inside to outside the cylindrical portion 78 are formed in the cylindrical portion 78. The through holes 83 are formed at a plurality of parts of the cylindrical portion 78 in a circumferential direction so as to be placed at the same position in a height direction. One ball 84 (see FIG. 4) is inserted into each of the through holes 83. In regard to the through hole 83 on a right side in FIG. 7, the ball 84 is omitted for convenience of comprehension (which applies to FIGS. 9 to 12). Further, each of the through holes 83 is formed so that its diameter becomes smaller as it extends outward such that the diameter at an outermost position is smaller than that of the ball 84. This prevents the ball 84 from falling off outside.

Figure 8:
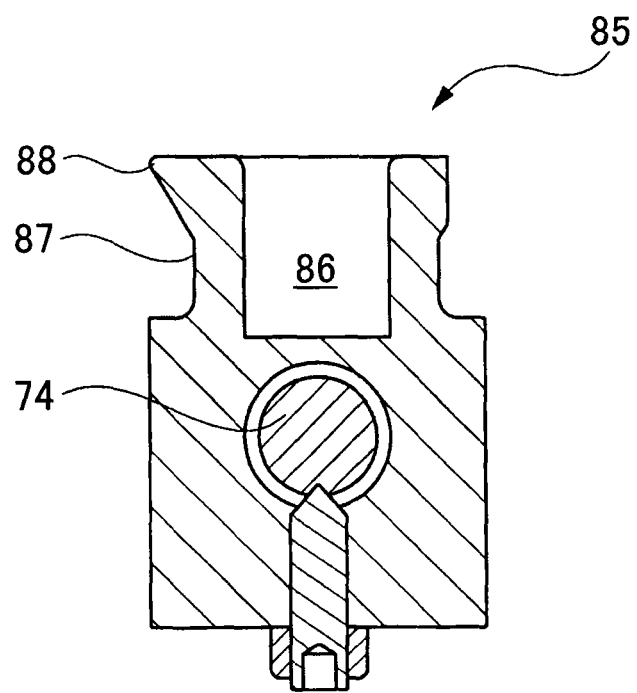
FIG. 8 is a sectional view of a piston enclosed in the tool.

A piston 85 (see FIG. 8) is enclosed in the internal space 77 of the body portion 72. The piston 85 has a generally columnar shape, but a spring socket 86 is formed on its upper end part. A spring 89 is sandwiched between the spring socket 86 and the cover portion 79 of the small diameter portion 76. Further, an inside recessed portion 87 is formed on an outer peripheral surface of the piston 85 at a position close to an upper end, and an inside top portion 88 having a diameter larger than the inside recessed portion 87 is formed above the inside recessed portion 87. Further, the rod pin 74 is attached to the piston 85 in a fixed manner. In the tool 70, a tip portion of the rod pin 74 comes outside the body portion 72.

A view illustrated in FIG. 7 is a sectional view in a free state where the tool 70 is held by neither the fork 82 nor the upper tool attaching portion 21 (the adapter 25). In this state, the piston 85 is pushed down to a lower limit in its movable range by an elastic force of the spring 89. At this time, the inside top portion 88 of the piston 85 is put on the ball 84, so that the ball 84 is slightly pushed outwardly. That is, a part of the ball 84 is projected outwardly from an outer surface of the small diameter portion 76, and the ball 84 is prohibited from further moving inwardly. That is, the spring 89 biases the piston 85 so that the inside top portion 88 faces the ball 84. Further, a part of the rod pin 74 cuts into the groove 73 of the body portion 72 in a width range (a height direction) of the groove 73.

At the time when the tool 70 is attached to the fork 82 of the upper tool parking 71, the tool 70 is pushed into the fork 82 toward a left side in the Y-direction as illustrated in FIG. 6. Hereby, the fork 82 fits into the groove 73 of the tool 70. At this time, the rod pin 74 faces a direction (the X-direction) intersecting with a pushing direction. Along with this pushing operation, the rod pin 74 is pushed up against the elastic force of the spring 89 by the tapered portion 824 of the fork 82. However, at this time, the tool 70 moves horizontally without moving upward. This is because the fork 82 fits into the groove 73, so that the movement of the tool 70 itself in the Z-axis direction is prevented.

Figure 9:
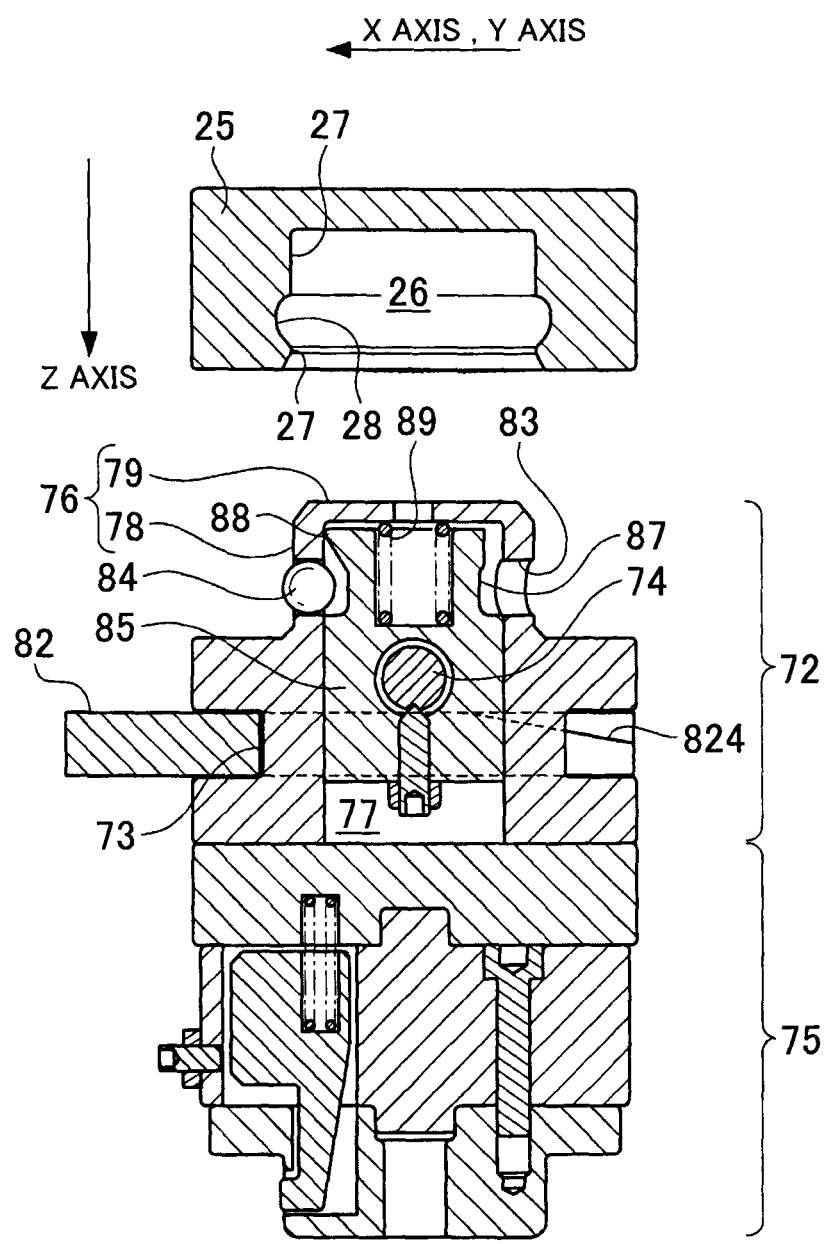
FIG. 9 is a sectional view of the tool held by the fork.

Hereby, the tool 70 has a cross section as illustrated in FIG. 9. In the tool 70 in FIG. 9, positions of the piston 85 and the rod pin 74 are slightly moved up in comparison with a state illustrated in FIG. 7. Along with this, the spring 89 is slightly contracted. The rod pin 74 is pushed up by the fork 82 so as to move up outside the width range (the height direction) of the groove 73. In this state, the rod pin 74 is pressed against a top face of the fork 82 due to the elastic force of the spring 89. Accordingly, the tool 70 does not fall off from the fork 82 by itself. Further, in this state, not the inside top portion 88 but the inside recessed portion 87 of the piston 85 faces the ball 84. Because of this, prohibition of inward movement of the ball 84 by the inside top portion 88 is canceled. That is, the ball 84 is in a state where the ball 84 can move inwardly if it is pushed from outside. That is, the piston 85 is pushed back by the tapered portion 824 so that the inside recessed portion 87 faces the ball 84.

Thus, the tool 70 held by the fork 82 is gripped by the upper tool attaching portion 21. For this purpose, the upper tool attaching portion 21 is moved right above the tool 70 to be gripped. That is, the upper tool attaching portion 21 is moved up to a sufficiently high position by the upper Z-axis robot 22, and then moved, by the upper XY-axis robot 23, to a position right above a target tool 70. The adapter 25 illustrated in FIG. 9 indicates the adapter 25 of the upper tool attaching portion 21 at this position. This position of the adapter 25 is a non-grip position at which the tool 70 is not gripped. Note that FIG. 9 does not illustrate the other part of the upper tool attaching portion 21 except the adapter 25.

Here, with reference to FIG. 9, an internal shape of the adapter 25 is described. As illustrated in FIG. 9, a hole 26 is formed on an end surface (a bottom end surface in FIG. 9) of the adapter 25. The hole 26 is formed to have such a magnitude that allows the small diameter portion 76 of the tool 70 to be entirely accommodated in the hole 26. An outside recessed portion 28 and an outside top portion 27 provided closer to an opening side relative to the outside recessed portion 28 are formed on a wall surface of the hole 26. A bore diameter of the outside top portion 27 is, of course, smaller than a bore diameter of the outside recessed portion 28. Further, the bore diameter of the outside top portion 27 is smaller than a radius of a circle formed by an outermost part of the ball 84 in the state of FIG. 7 with respect to a center of the tool 70.

Figure 10:
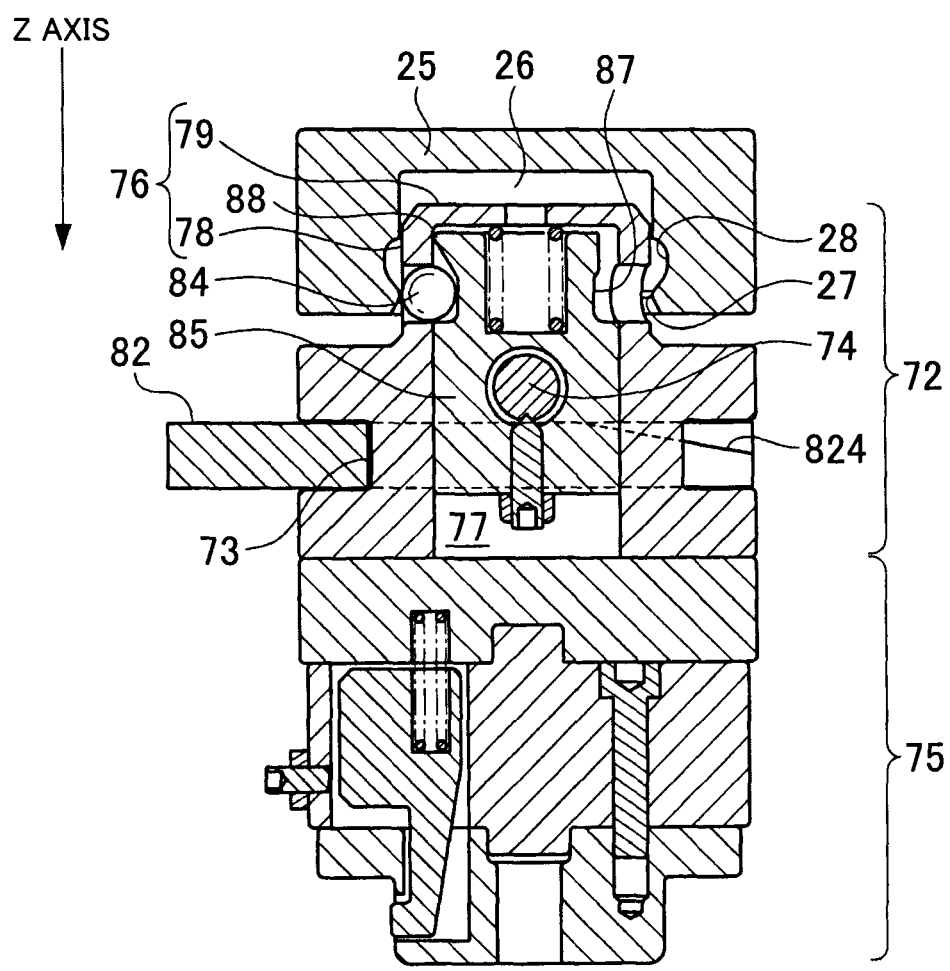
FIG. 10 is a sectional view (No. 1) illustrating a state where the tool is gripped by an upper tool attaching portion.
Figure 11:
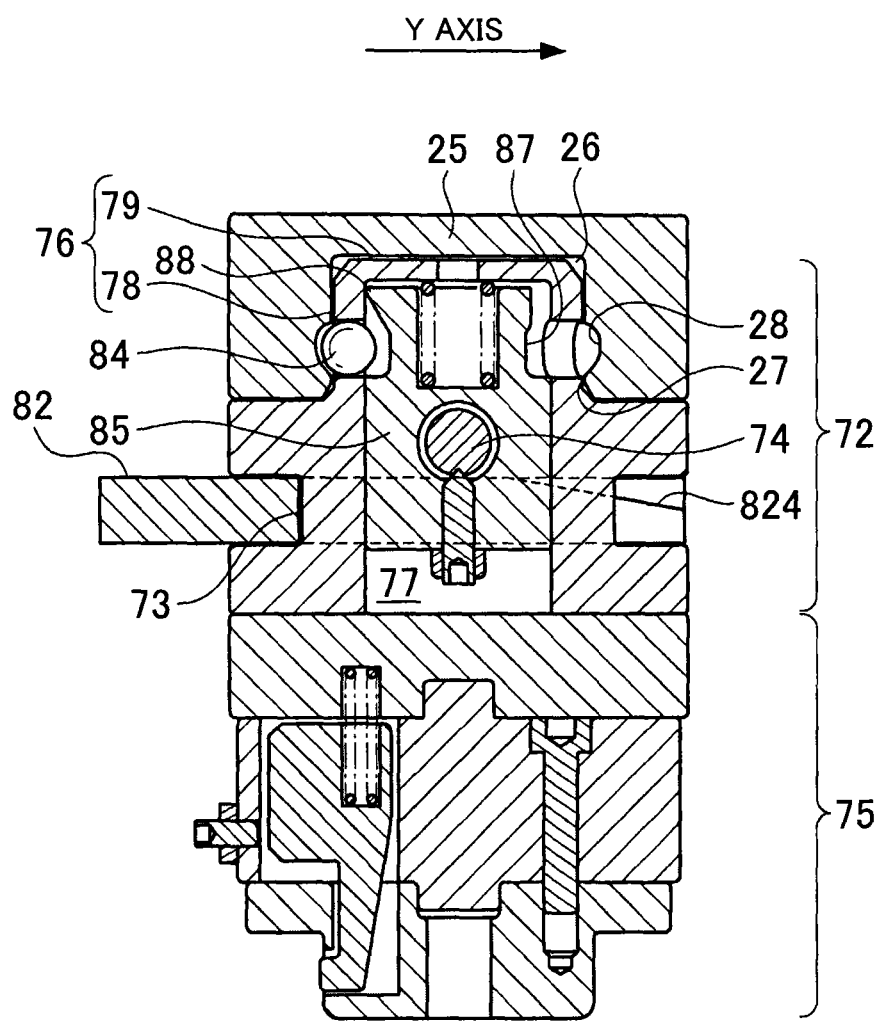
FIG. 11 is a sectional view (No. 2) illustrating a state where the tool is gripped by the upper tool attaching portion.

Such an adapter 25 is moved down by the upper Z-axis robot 22 from a position in FIG. 9. Hereby, the adapter 25 covers the small diameter portion 76 of the tool 70. In the middle of moving down, the outside top portion 27 may make contact with the ball 84. However, at this time, the ball 84 can move inwardly. That is, when the outside top portion 27 makes contact with the ball 84, the ball 84 is pushed inwardly within a range of the through hole 83 and the inside recessed portion 87. Because of this, the adapter 25 can move down without any difficulty (FIG. 10). Accordingly, the adapter 25 moves from the non-grip position illustrated in FIG. 9 to a position (FIG. 11) at which the adapter 25 has completely moved down to lower end. In the state of FIG. 11, a bottom face of the adapter 25 makes contact with a top face of that part of the body portion 72 of the tool 70 except the small diameter portion 76. Further, the outside top portion 27 of the adapter 25 is placed on a lower side relative to the ball 84. This position of the adapter 25 is a grip position to grip the tool 70.

The adapter 25 is further moved toward a right side (in the Y-direction) in FIG. 11 by the upper XY-axis robot 23 from the state of FIG. 11, so as to pull the tool 70 from the fork 82. Note that, as described above, the rod pin 74 is being pressed against the fork 82, but this does not disturb a forced movement by the upper XY-axis robot 23. This movement causes the rod pin 74 to move over the tapered portion 824, thereby releasing upward pressing of the rod pin 74 by the fork 82. On this account, the positions of the piston 85 and the rod pin 74 in the tool 70 are returned to the same positions as those illustrated in FIG. 7 by the elastic force of the spring 89.

Figure 12:
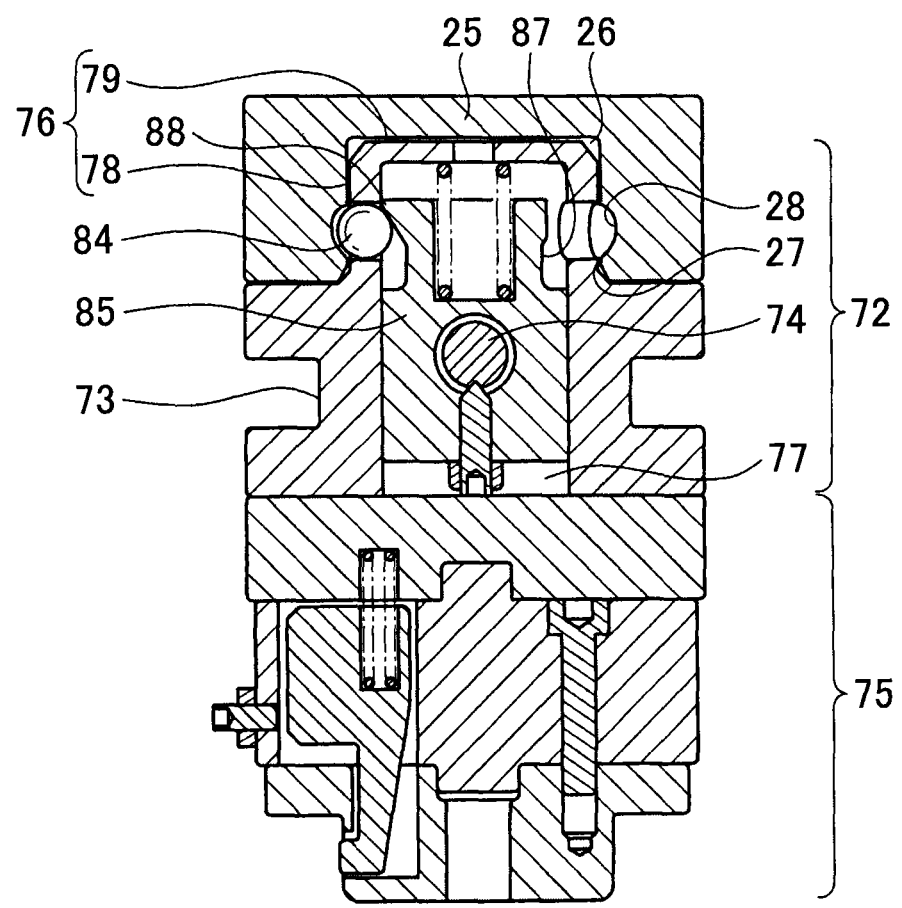
FIG. 12 is a sectional view (No. 3) illustrating a state where the tool is gripped by the upper tool attaching portion.

This state is illustrated in FIG. 12. In the state of FIG. 12, the ball 84 is projected outward due to an action of the inside top portion 88 of the piston 85 similarly to FIG. 7 described above. A part of the ball 84 thus projected comes inside the outside recessed portion 28. Further, the outside top portion 27 of the adapter 25 is placed on a lower side relative to the ball 84. As thus described, the ball 84 is caught on the outside top portion 27, which prevents the tool 70 from falling off from the adapter 25. This is because the movement of the adapter 25 from the grip position to the non-grip position is prohibited by the ball 84. The tool 70 is thus gripped by the upper tool attaching portion 21.

A moving direction of the adapter 25 from the position in FIG. 9 to the position in FIG. 11 at this time is the same as a press-fitting direction at the time of performing press-fitting. On this account, the adapter 25 (the upper tool attaching portion 21) performs a gripping operation on the tool 70 by a moving up/down function of the upper Z-axis robot 22. Further, by a Y-axis movement function of the upper XY-axis robot 23, the tool 70 is taken out from the fork 82 (the upper tool parking 71). Further, returning of the tool 70 from the upper tool attaching portion 21 to the fork 82 can be performed by moving the upper tool attaching portion 21 in a reverse order to the above. Further, by performing the above procedure in an upside-down manner, a relationship between the tool 80 and the lower tool attaching portion 31 and structures thereof are just established.

The above description deals with the detailed configuration of each part of the press-fitting device 1. A procedure of a press-fitting operation in such a press-fitting device 1 is described below. First, necessary types of tools 70 and tools 80 for the present press-fitting operation are set in advance in the upper tool parking 71 and the lower tool parking 81. Particularly, in terms of each tool 70, 80 except a backup tool (the tool 70E, 80E), a corresponding press-fitting component is attached to a tip portion thereof. Then, the lower inner plate 50 is moved down by the lifter 51. A state where a workpiece W is received on the lower inner plate 50 in the above state is illustrated diagrammatically in FIG. 13.

Then, the lower inner plate 50 is moved up by thrust of the lifter 51 until the workpiece W makes contact with the upper inner plate 40. After that, the lifter 51 is maintained in a position control state in which a given height is maintained.

Figure 14:
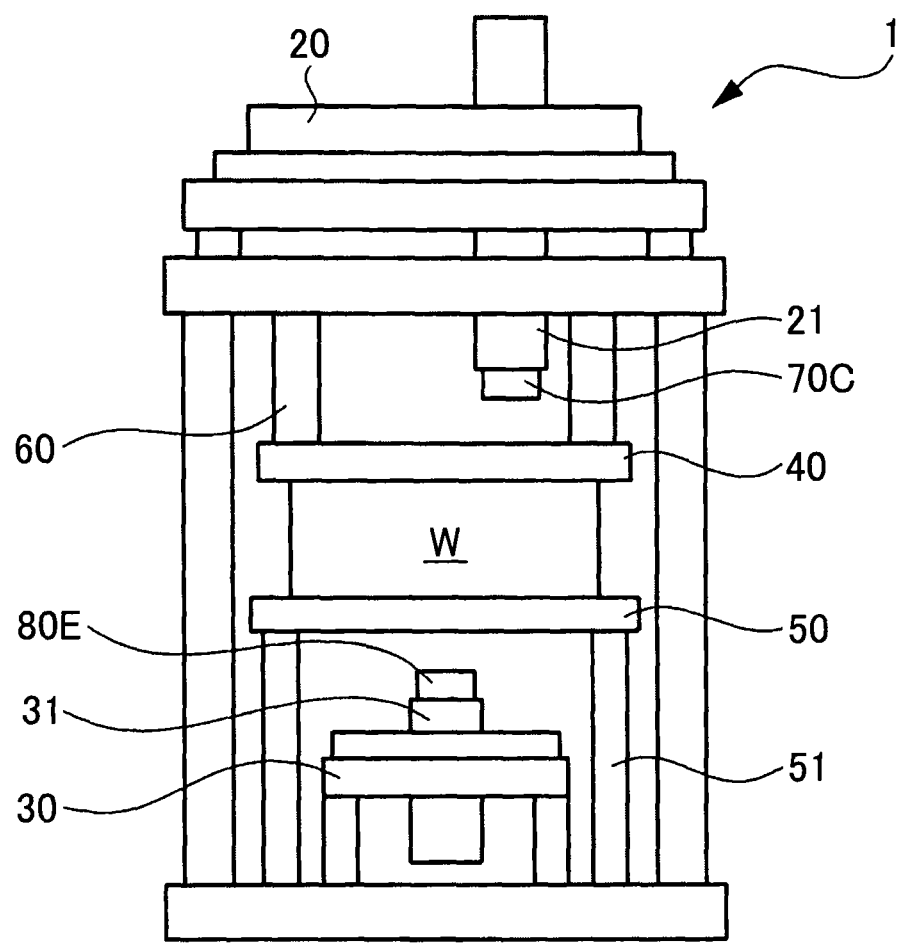
FIG. 14 is a front view diagrammatically illustrating a state where the workpiece is sandwiched between upper and lower inner plates.

Further, the tools 70, 80 are gripped by the upper tool attaching portion 21 and the lower tool attaching portion 31, respectively. This state is diagrammatically illustrated in FIG. 14.

One of the tools 70, 80 gripped here is the backup tool 70E or 80E. Which one of the upper tool attaching portion 21 and the lower tool attaching portion 31 grips the backup tool 70E or 80E is determined depending on whether a target press-fitting part is placed on a top face of the workpiece W or a bottom face thereof. In a case where press-fitting is performed on the top face, the backup tool 80E is gripped by the lower tool attaching portion 31, and in a case where press-fitting is performed on the bottom face, the backup tool 70E is gripped by the upper tool attaching portion 21. More specifically, the controlling portion 90 receives specification information of the workpiece W, and provides an instruction to the upper tool attaching portion 21 and the lower tool attaching portion 31 based on the specification information thus received.

Further, in either case, on a side opposite to a side where the backup tool 70E or 80E is gripped, any of various tools 70A to 70D or 80A to 80D to which a press-fitting component is attached is gripped. About selection on which tool is gripped specifically, the controlling portion 90 provides an instruction to the upper tool attaching portion 21 or the lower tool attaching portion 31 based on the specification information. In the following description, a tool on a lower side is the backup tool 80E, and a tool on an upper side is the tool 70C.

Figure 15:
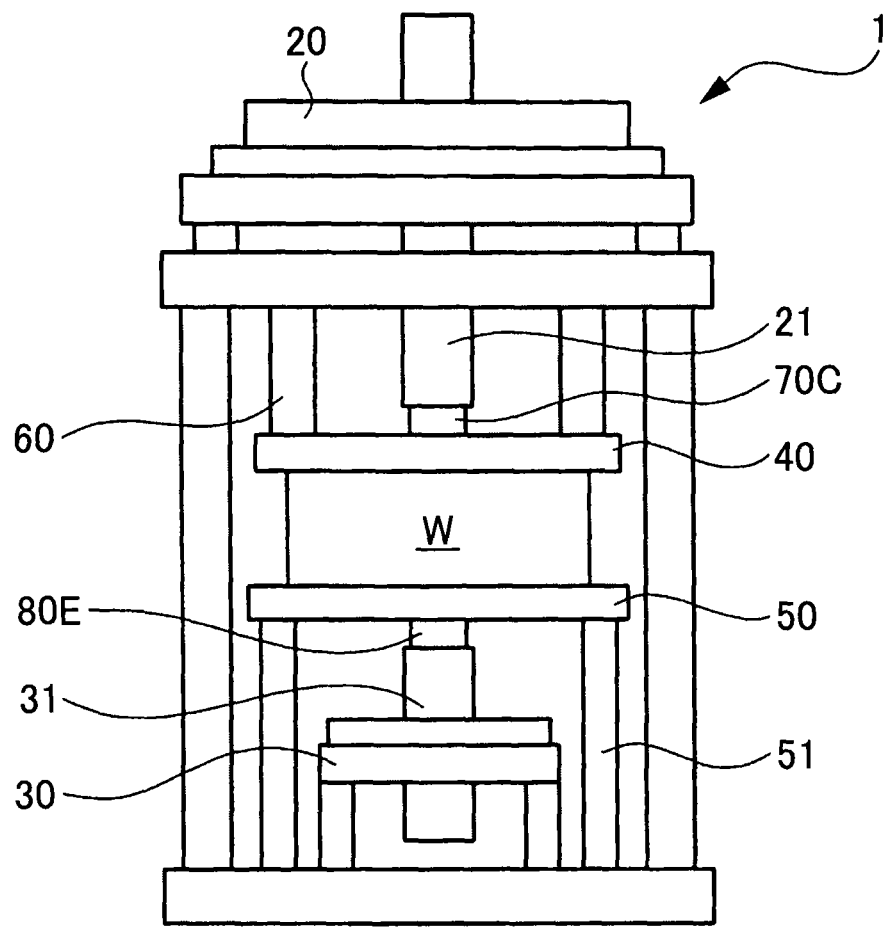
FIG. 15 is a front view diagrammatically illustrating a state where press-fitting is performed.

The upper and lower tools 70C, 80E are subjected to a three-dimensional position control, so as to be pressed against the workpiece W (FIG. 15). A position at which the tool 70C is pressed is naturally a position of the workpiece W at which the component is press-fitted. A position at which the tool 80E is pressed is preferably a position right in back of a press-fitting position. In a state where the upper and lower tools 70C, 80E are pressed against the workpiece W, the tools 70C, 80E are further pressed against the workpiece W with the upper Z-axis robot 22 and the lower Z-axis robot 32, so that the component is press-fitted onto the workpiece W.

Figure 16:
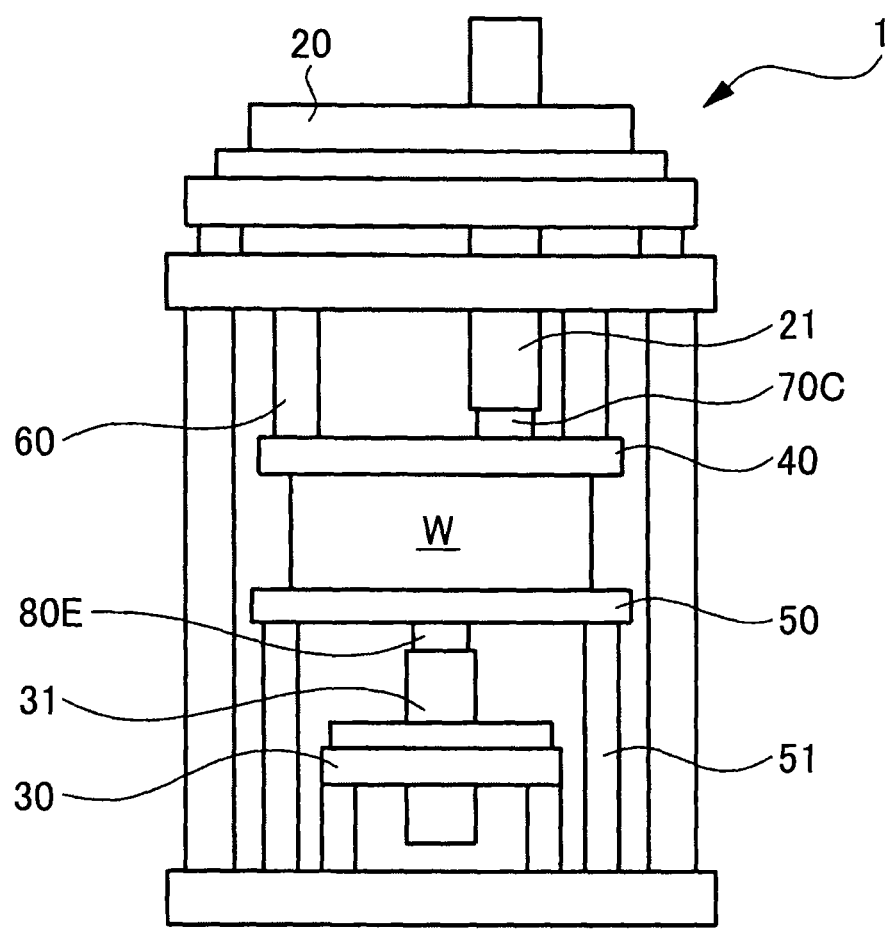
FIG. 16 is a front view diagrammatically illustrating a state (offset) where press-fitting is performed.

Depending on a type of the workpiece W, the backup tool 70E or 80E cannot be pressed at a position right in back of the press-fitting position. Such a case includes a case where some sort of a fragile structural object exists at the position right in back of the press-fitting position. In such a case, the backup tool 70E or 80E is pressed at a position which is close to the position right in back of the press-fitting position and at which the backup tool 70E or 80E can be pressed (FIG. 16). When press-fitting is performed in such an offset state, a torque to incline the workpiece W may be caused due to pressing thrusts of the upper Z-axis robot 22 and the lower Z-axis robot 32. However, the attitude control device 60 described with reference FIG. 2 can maintain the upper inner plate 40 to be horizontal. This makes it possible to prevent inclination of the workpiece W. Accordingly, it is possible to normally perform press-fitting even in the offset state.

When the component is press-fitted as illustrated in FIG. 15 or FIG. 16, a next press-fitting component is press-fitted. On this account, the tools 70, 80 are replaced in the upper tool attaching portion 21 and the lower tool attaching portion 31 as appropriate, and press-fitting is performed on a next press-fitting part. After press-fitting of all press-fitting components to the workpiece W is completed, the lifter 51 is moved down to remove the workpiece W. Then, press-fitting components are refilled in terms of the tools 70, 80 except the backup tools 70E, 80E. Then, a next workpiece W is received, and the same procedure is repeated. The press-fitting device 1 performs press-fitting in this way, so that its versatility is high. That is, even if types of workpieces W are different, only suitable tools 70, 80 for those workpieces W are just prepared, and the main body of the press-fitting device 1 can be used in common.

Figure 17:
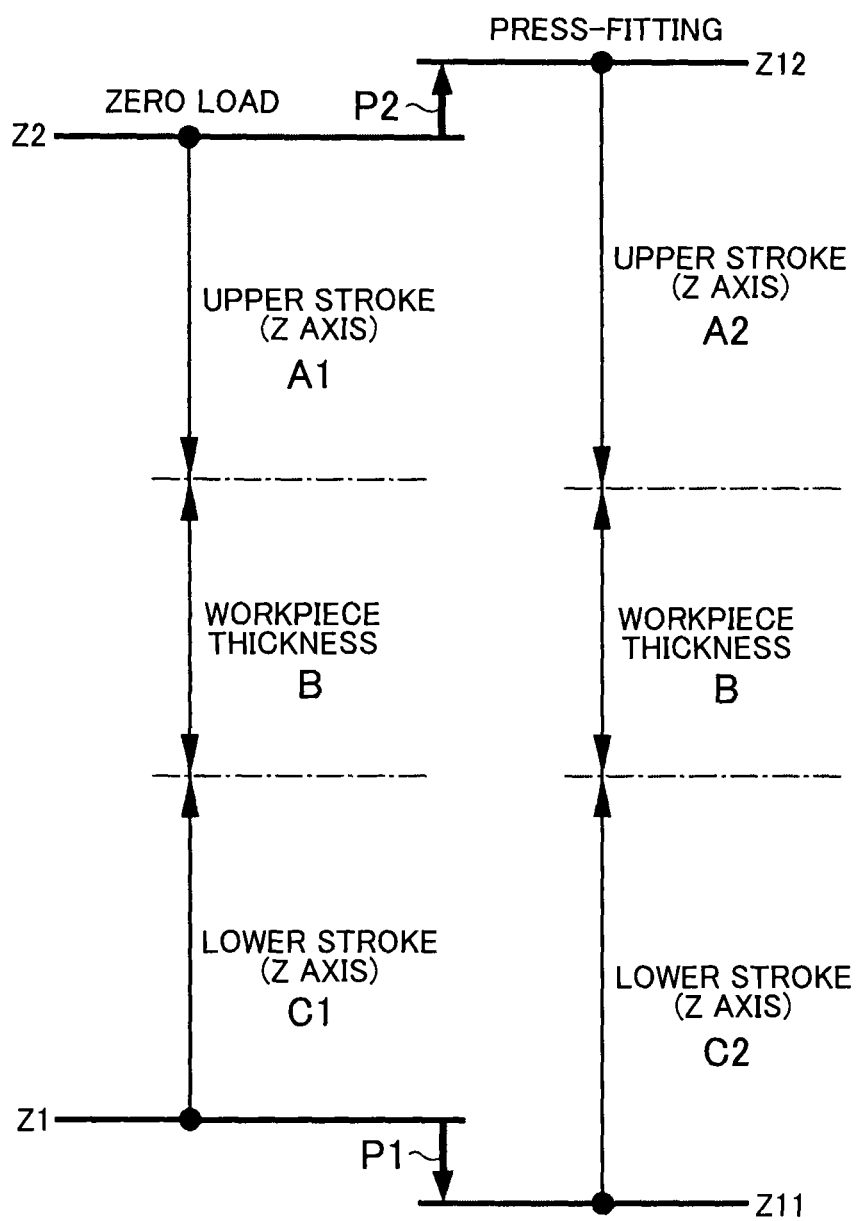
FIG. 17 is a schematic view to describe an influence of displacement with respect to a press-fitting stroke.

At the time of press-fitting, a control of a press-fitting stroke (a moving amount of the tool in the Z-axis direction) is performed. In the press-fitting device 1, displacement of a reference position due to a reaction force of a press-fitting load is corrected in the control of the press-fitting stroke. In this regard, with reference to FIG. 17, the following first describes an influence of displacement with respect to a press-fitting stroke. In FIG. 17, a left half illustrates a case of a zero load and a right half illustrates a case where a load of press-fitting is applied. Respective meanings of Z1, Z2, Z11, Z12 in FIG. 17 are as follows. Z1: a tip position of the tool 80 at the time when the lower Z-axis robot 32 is placed at a lowest position, in the case of a zero load (an original lower reference position). Z2: a tip position of the tool 70 at the time when the upper Z-axis robot 22 is placed at an uppermost position, in the case of a zero load (an original upper reference position). Z11: a tip position of the tool 80 at the time when the lower Z-axis robot 32 is moved to a lowest position, in the case of press-fitting (a displaced lower reference position). Z12: a tip position of the tool 70 at the time when the upper Z-axis robot 22 is moved to an uppermost position, in the case of press-fitting (a displaced upper reference position).

That is, a distance between Z1 and Z2 in FIG. 17 is a maximum value between the upper and lower tools 70, 80 in the case of a zero load. A workpiece W is placed therebetween, so that, in FIG. 17, its thickness is indicated by B, an upper stroke amount is indicated by A1, and a lower stroke amount is indicated by C1. If each part of the press-fitting device 1 is made of a perfectly rigid body, when the upper stroke amount is A1 and the lower stroke amount is C1, respective tip ends of the upper and lower tools 70, 80 (a reference plane that holds a component, in terms of a press-fitting tool) make contact with the workpiece W. At this time, a press-fitting component comes inside the workpiece W, so that press-fitting is accomplished. In practice, a sum total of the upper and lower stroke amounts should be equal to A1+C1. This is because the Z1-Z2 distance is known per combination of tools 70, 80 to be used, and the workpiece thickness B is known per press-fitting position based on the specification of the workpiece W.

However, in practice, each part of the press-fitting device 1 is slightly bent due to a load of press-fitting, so that the upper and lower reference positions are displaced at the time of press-fitting as illustrated on the right side in FIG. 17. That is, the upper and lower reference positions both move away from the workpiece W in comparison with the case of a zero load. In FIG. 17, a displacement amount of the lower reference position is indicated by P1, and a displacement amount of the upper reference position is indicated by P2. On this account, even if the sum total of the upper and lower stroke amounts is made equal to A1+C1, press-fitting is not completed actually.

Figure 18:
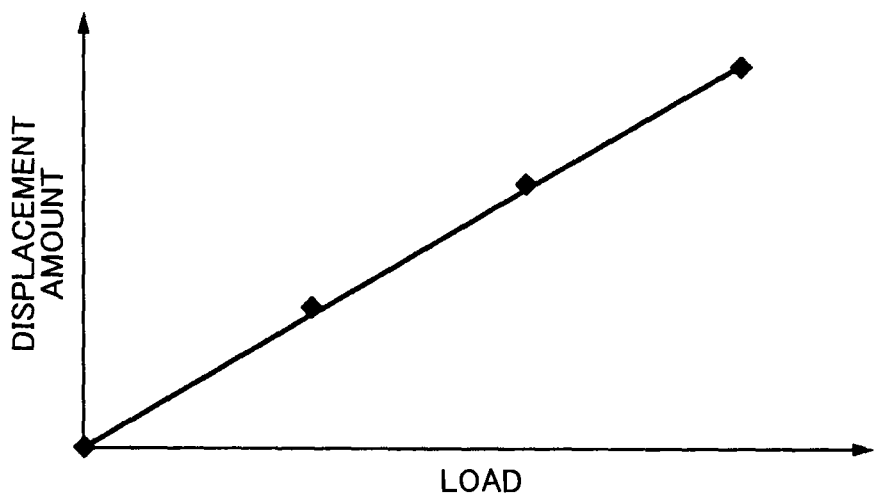
FIG. 18 is a graph showing a relationship between a load and a displacement amount.
Figure 19:
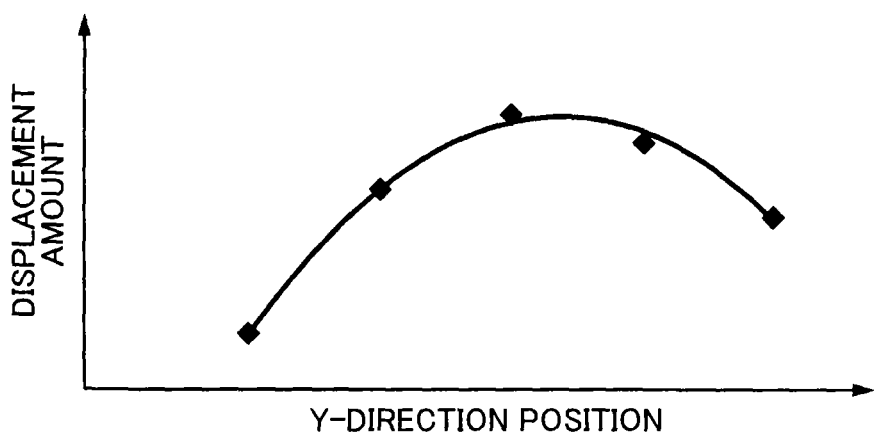
FIG. 19 is a graph showing a difference in the displacement amount between positions.

The displacement amounts P1, P2 are generally proportional to a load of press-fitting as shown in FIG. 18. In FIG. 18, a horizontal axis indicates a load, and a vertical axis indicates a sum total of the upper and lower displacement amounts P1, P2. Further, the displacement amounts P1, the P2 vary depending on XY coordinates of a press-fitting position. Since a displacement amount is caused due to bending, the displacement amount increases as the press-fitting position approaches a center of the device, and the displacement amount decreases as the press-fitting position approaches a periphery. In view of this, when the displacement amount is plotted relative to a Y-direction position as shown in FIG. 19, a curve having an upwardly projecting shape is formed. In FIG. 19, an X-direction position is fixed and a load is constant. In practice, a graph like the one illustrated in FIG. 19 can be drawn for each X-direction position, and further for each load value. Further, these graphs can be further drawn for each of the upper and lower displacement amounts P1, P2.

Figure 20:
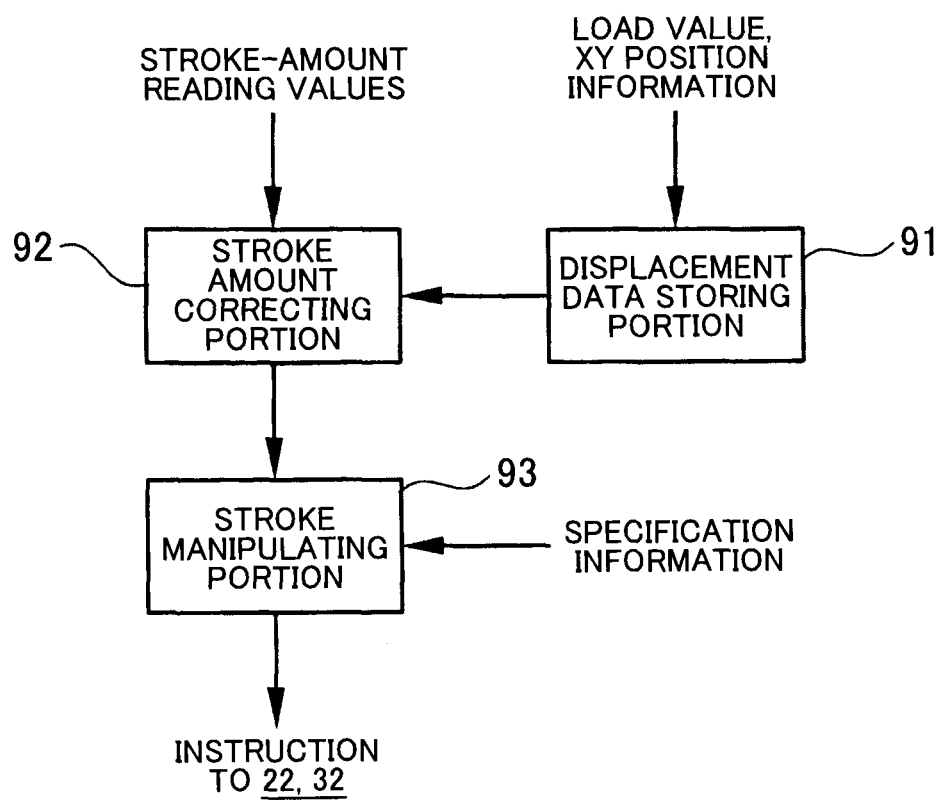
FIG. 20 is a block diagram of a stroke control.

In view of this, in the press-fitting device 1, a control structure as illustrated in FIG. 20 is provided in the controlling portion 90. A control block of FIG. 20 is provided with a displacement data storing portion 91, a stroke amount correcting portion 92, and a stroke manipulating portion 93.

The displacement data storing portion 91 is a portion for storing the displacement amounts described above. That is, a displacement amount map according to XY coordinates of a press-fitting position is stored for each load value and for each of an upper side and a lower side. Alternatively, a displacement amount map in a standard load for each of an upper side and a lower side, and a coefficient according to a load value may be stored therein. As each value for the displacement amount, a value obtained by examinations performed in advance under each condition may be used. The displacement data storing portion 91 receives information of a current load value, and XY positional information of a press-fitting position. Hereby, values corresponding to a current situation are read from the displacement amount maps thus stored. Current upper and lower displacement amounts thus read out are supplied to the stroke amount correcting portion 92. Note that, in a case of offset press-fitting as illustrated in FIG. 16, XY positional information of a backup side is not a press-fitting position, but information of a pressing position of the backup tool 70E, 80E.

The stroke amount correcting portion 92 is a portion for correcting reading values of stroke amounts. The reading values of the stroke amounts are read out from the upper Z-axis robot 22 and the lower Z-axis robot 32. From the reading values, respective displacement amounts are subtracted. The displacement amounts for this purpose are provided from the displacement data storing portion 91 as described above.

The stroke manipulating portion 93 is a portion for manipulating the upper Z-axis robot 22 and the lower Z-axis robot 32. On this account, the stroke manipulating portion 93 compares the reading values of the stroke amounts with a necessary stroke amount. The reading values here indicate reading values that are corrected by the stroke amount correcting portion 92 as described above. The necessary stroke amount indicates "A1+C1" described in the description of FIG. 17, and is provided from specification information of the workpiece W. If the reading values thus corrected do not reach the necessary stroke amount, press-fitting is not completed. Accordingly, the upper Z-axis robot 22 and the lower Z-axis robot 32 are instructed to increase a press-fitting load. Hereby, the stroke amount for press-fitting is controlled. When the reading values thus corrected reach the necessary stroke amount, press-fitting is completed. Accordingly, the upper Z-axis robot 22 and the lower Z-axis robot 32 are instructed to release the press-fitting load so as to retract the tool 70, 80 from the workpiece W.

Figure 21:
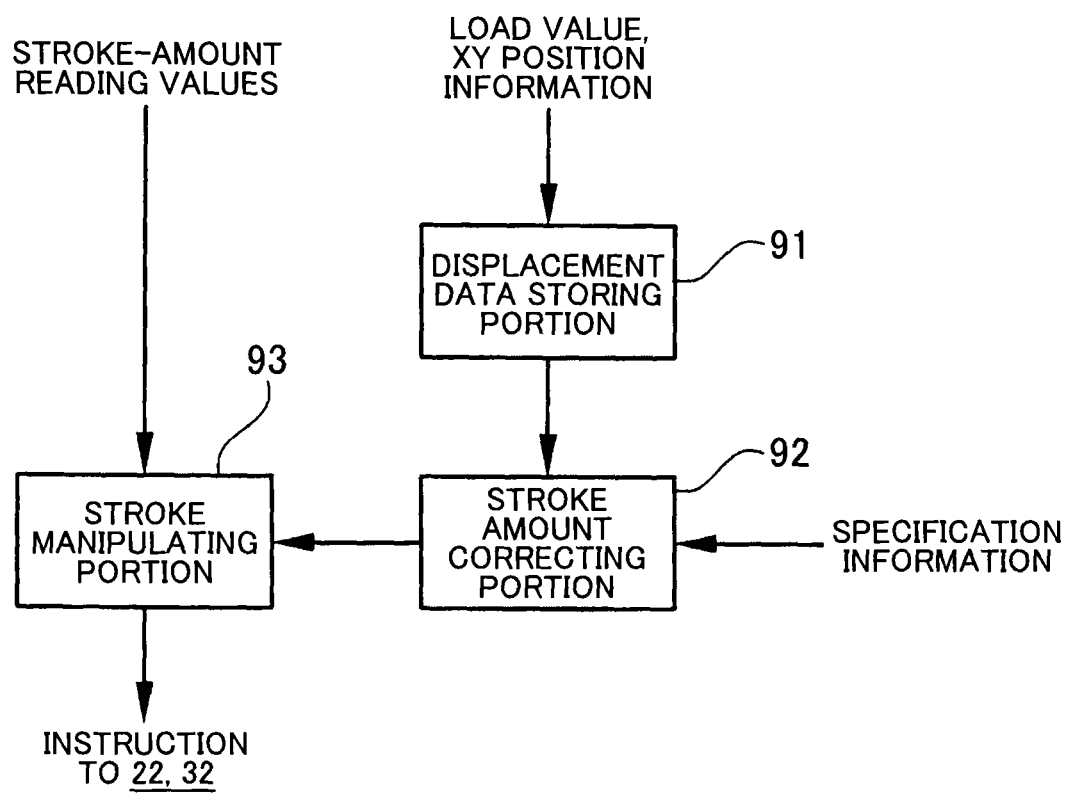
FIG. 21 is a block diagram of another example of the stroke control.

Thus, in the press-fitting device 1, it is possible to perform appropriate press-fitting by correcting the displacement due to the press-fitting load. Note that the aforementioned stroke amount correcting portion 92 in FIG. 20 corrects reading values of stroke amounts, but is not limited to this, and may be may be configured as illustrated in a block diagram of FIG. 21. In FIG. 21, the stroke amount correcting portion 92 is configured to correct the necessary stroke amount rather than the reading values of the stroke amounts. That is, the stroke amount correcting portion 92 in FIG. 21 adds a displacement amount to a necessary stroke amount provided from the specification information. Accordingly, the stroke manipulating portion 93 in this case compares the reading values of the stroke amounts as they are with the necessary stroke amount thus corrected. The necessary stroke amount thus corrected indicates a sum of A2 and C2 in FIG. 17. Even in such a technique, it is possible to perform press-fitting appropriately. Moreover, it is possible to correct both the reading values and the necessary stroke amount. In that case, the displacement amount may be divided into two (two equal amounts, for example) and distributed to them.

Selection of the tools 70, 80 and execution of the press-fitting operation are performed by the control of the controlling portion 90 sequentially for all component press-fitting parts of the workpiece W.

As described above in detail, according to the present embodiment, in a stroke amount control at the time of press-fitting, correction is performed in consideration of displacement of the reference position due to a press-fitting load. This accordingly realizes a press-fitting device that can perform appropriate press-fitting without causing poor press-fitting due to distortion caused by the press-fitting load. Further, it is not necessary to configure each part of the frame 10 to have extremely high rigidity, which is advantageous to downsizing and lightweighting of the device. Further, according to the present embodiment, the upper tool parking 71 and lower tool parking 81 are provided so as to store various kinds of the tool groups 70, 80 therein. By driving the upper and lower adapters 25 by a three-dimensional movement function of the upper and lower robots, necessary tools 70, 80 are used selectively. This accordingly realizes a press-fitting device having high versatility that allows the press-fitting device to deal with a wide variety of workpieces W. Moreover, the upper and lower tool groups 70, 80 each include a backup tool (70E, 80E), so that press-fitting can be performed from either of upper and lower sides without changing a workpiece W. Further, since the attitude control device 60 is provided, inclination of the workpiece W is prevented. Hereby, offset press-fitting can be performed normally.

Note that the above embodiment is merely an example, and does not limit the present invention at all. Accordingly, it goes without saying that the present invention can be altered or modified variously within a range which does not deviate from the gist of the present invention. For example, in the above embodiment, the lower inner plate 50 is provided with the lifter 51, so that the workpiece W is held between the lower inner plate 50 and the upper inner plate 40 by moving up the lower inner plate 50. Alternatively, the workpiece W may be held by moving down the upper inner plate 40 instead of moving up the lower inner plate 50. Further, the workpiece W may be held by moving up the lower inner plate 50 and moving down the upper inner plate 40.

Further, instead of providing the attitude control device 60 on an upper-inner-plate-40 side, the attitude control device 60 may be provided on a lower-inner-plate-50 side. Further, the inside top portion 88 and the inside recessed portion 87 of the piston 85 in the tool 70, 80 may be provided over a whole circumference of a lateral face of the piston 85, or may be provided only in that part of the piston 85 where the ball 84 is provided. The same can apply to the outside top portion 27 and the outside recessed portion 28 of the adapter 25. Further, the groove 73 of the tool 70, 80 may be provided over a whole circumference of the body portion 72 of the tool 70, 80, or may be provided in a necessary range for insertion into the fork 82. Further, the ball 84 may not be necessarily spherical.

A press-fitting device includes: a workpiece holding portion configured to hold a workpiece as a press-fitting object; a one-side pressing unit configured to press, in a first direction against the workpiece held by the workpiece holding portion, either one of a press-fitting tool configured to press a press-fitting component onto the workpiece and a backup tool configured to restrain a position change of the workpiece during a press-fitting operation, the one-side pressing unit being also configured to adjust a three-dimensional position of the either one of the press-fitting tool and the backup tool; an other-side pressing unit configured to press the other one of the press-fitting tool and the backup tool which is not pressed by the one-side pressing unit, against the workpiece held by the workpiece holding portion, in a second direction opposite to the first direction that is a pressing direction of the one-side pressing unit, the other-side pressing unit being also configured to adjust a three-dimensional position of the other one of the press-fitting tool and the backup tool; and a storing portion configured to store a plurality of press-fitting tools or the backup tool to be used by the one-side pressing unit or the other-side pressing unit. Each of the one-side pressing unit and the other-side pressing unit includes an adapter configured to grip the press-fitting tool or the backup tool. Each of the press-fitting tool and the backup tool includes: a locking member configured to take a retracting position that allows movement of the adapter between a non-grip position and a grip position, and a projection position that does not allow the movement of the adapter between the non-grip position and the grip position; an inside member including an inside recessed portion that allows the locking member to be positioned at the retracting position, and a large diameter portion that does not allow the locking member to be positioned at the retracting position; and a biasing member configured to bias the inside member so that the large diameter portion faces the locking member. The storing portion has a pushing-back shape so as to push back the inside member of the press-fitting tool or the backup tool stored therein, against the biasing of the biasing member so that the inside recessed portion faces the locking member. The storing portion, the press-fitting tool, and the backup tool forms a prohibition shape that prohibits the press-fitting tool or the backup tool stored in the storing portion from being moved in a biased direction by the biasing member.

In the press-fitting device, the press-fitting tool and the backup tool may include an exposed member attached to the inside member and having a tip end exposed outside, and the pushing-back shape may be a tapered portion that makes contact with the exposed member at the time when the press-fitting tool or the backup tool is pushed into the storing portion.

In the press-fitting device, when the press-fitting tool or the backup tool is pushed into the storing portion, the exposed member of the press-fitting tool or the backup tool makes contact with the pushing-back shape of the storing portion. Hereby, the inside member is pushed back, so that the locking member can retract to the retracting position.

In the press-fitting device, the storing portion may hold the press-fitting tool or the backup tool so that a moving direction between the non-grip position and the grip position of the press-fitting tool or the backup tool by the adapter accords with a pressing direction at the time of a press-fitting operation by the one-side pressing unit and the other-side pressing unit.

In the press-fitting device, the adapter moves in the same direction as the pressing direction at the time of the press-fitting operation, so that the adapter can move between the non-grip position and the grip position of the press-fitting tool or the backup tool. On this account, the adapter can perform an operation to grip the press-fitting tool or the backup tool and then return it by means of a mechanism (the one-side pressing unit and the other-side pressing unit) that moves the adapter for the press-fitting operation. That is, it is not necessary to include a special mechanism for driving the adapter to perform a gripping operation on the press-fitting tool or the backup tool.

In the press-fitting device, the adapter may include: a top portion which pushes the locking member into the retracting position at the time of the movement between the non-grip position and the grip position and which is caught on the locking member placed at the projection position at the time when the adapter is placed at the grip position; and an outside recessed portion in which the locking member placed at the projection position partially enters at the time when the adapter is placed at the grip position.

In the press-fitting device, in a state where the press-fitting tool or the backup tool is gripped by the adapter, part of the locking member of the press-fitting tool or the backup tool enters the outside recessed portion of the adapter. On this account, since the top portion of the adapter is caught on the locking member, the press-fitting tool or the backup tool is prevented from falling off from the adapter.

The press-fitting device may include a tool selection controlling portion configured to receive specification information of the workpiece, and control, based on the specification information thus received, the one-side pressing unit and the other-side pressing unit to each select and grip a suitable one of the press-fitting tools and the backup tool stored in the storing portion for press-fitting to a component press-fitting part of the workpiece, thereby performing press-fitting in such a gripped state, the tool selection controlling portion being configured to sequentially perform selection of the press-fitting tool and the backup tool and execution of press-fitting in such a selection state with respect to all component press-fitting parts of the workpiece.

A press-fitting device includes: a workpiece holding portion configured to hold a workpiece as a press-fitting object; a one-side pressing unit configured to press, in a first direction against the workpiece held by the workpiece holding portion, either one of a press-fitting tool configured to press a press-fitting component onto the workpiece and a backup tool configured to restrain a position change of the workpiece during a press-fitting operation, the one-side pressing unit being also configured to adjust a three-dimensional position of the either one of the press-fitting tool and the backup tool; and an other-side pressing unit configured to press the other one of the press-fitting tool and the backup tool which is not pressed by the one-side pressing unit, against the workpiece held by the workpiece holding portion, in a second direction opposite to the first direction that is a pressing direction of the one-side pressing unit, the other-side pressing unit being also configured to adjust a three-dimensional position of the other one of the press-fitting tool and the backup tool. The press-fitting device further includes: a one-side inner plate making contact with the workpiece from a side of the one-side pressing unit so as to serve the workpiece holding portion; an other-side inner plate making contact with the workpiece from a side of the other-side pressing unit so as to serve as the workpiece holding portion; and an attitude controlling portion including a plurality of extendable members placed in parallel with each other, so as to prevent inclination of at least one of the one-side inner plate and the other-side inner plate.

What is claimed is:

1. A press-fitting device comprising:
   a workpiece holding structure that holds a workpiece as a press-fitting object:
   a one-side pressing mechanism that presses, from one side, against the workpiece held by the workpiece holding structure, either one of a press-fitting tool that presses a press-fitting component onto the workpiece and a backup tool that restrains a position change of the workpiece during a press-fitting operation, and that three-dimensionally adjusts a position of the either one of the press-fitting tool and the backup tool;
   an other-side pressing mechanism that presses the other one of the press-fitting tool and the backup tool against the workpiece held by the workpiece holding structure, from an opposite side of the workpiece from the one-side pressing mechanism, and that three-dimensionally adjusts a position of the other one of the press-fitting tool and the backup tool; and
   a press-fitting controller that controls stroke amounts of the press-fitting tool and the backup tool in a press-fitting direction at a time of the press-fitting operation by the one-side pressing mechanism and the other-side pressing mechanism wherein
   the press-fitting controller includes:
      a stroke-amount manipulating device that manipulates the stroke amounts of the press-fitting tool and the backup tool in the press-fitting direction such that current values of the stroke amounts accord with necessary values of the stroke amounts, according to a result of a comparison of the current values with the necessary values;
      a displacement amount storage that outputs displacement amounts of the one-side pressing mechanism and the other-side pressing mechanism in the press-fitting direction, at the time of the press-fitting operation; and
      a correction device that corrects, based on the displacement amounts output from the displacement amount storage, at least one of the current values of the stroke amounts and the necessary values of the stroke amounts to be co pared in the stroke-amount manipulating device in terms of the stroke a punts of the press-fitting tool and the backup tool in the press-fitting direction,
   when a position right in back of a press-fitting position for the press-fitting tool is a position at which the backup tool is able to be pressed, the one-side pressing mechanism and the other-side pressing mechanism set a press-fitting position at which the backup tool is pressed against the workpiece to the position right in back of the press-fitting position for the press-fitting tool, and
   when the position right in back of the press-fitting position for the press-fitting tool is a position at which the backup tool is not able to be pressed, the one-side pressing mechanism and the other-side pressing mechanism set the press-fitting position at which the backup tool is pressed against the workpiece to a position that is adjacent to the position right in back of the press-fitting position for the press-fitting tool and at which the backup tool is able to be pressed.

2. The press-fitting device according to claim 1, wherein the displacement amount storage stores the displacement amounts found in advance per a press-fitting position and per a load value in the press-fitting direction, and outputs a corresponding displacement amount based on information of the press-fitting position and information of a current load value.

3. The press-fitting device according to claim 1, further comprising:
   a one-side inner plate making contact with the work piece from a side of the one-side pressing mechanism so as to serve as the workpiece holding structure;
   an other-side inner plate making contact with the workpiece from a side of the other-side pressing mechanism so as to serve as the workpiece holding structure; and
   an attitude controller including a plurality of extendable structures placed in parallel with each other, so as to prevent inclination of at least one of the one-side inner plate and the other-side inner plate.

4. A press-fitting device comprising:.
   a workpiece holding structure that holds a workpiece as a press-fitting object;
   a one-side pressing mechanism that presses, from one side, against the workpiece held by the workpiece holding structure, either one of a press-fitting tool that presses a press-fitting component onto the workpiece and a backup tool that restrains a position change of the workpiece during a press-fitting operation, and that three-dimensionally adjusts a position of the either one of the press-fitting tool and the backup tool;
   an other-side pressing mechanism that presses the other one of the press-fitting tool and the backup tool against the workpiece held by the workpiece holding structure, from an opposite side of the workpiece from the one-side pressing mechanism, and that three-dimensionally adjusts a position of the other one of the press-fitting tool and the backup tool;
   a press-fitting controller that controls stroke amounts of the press-fitting tool and the backup tool in a press-fitting direction at a time of the press-fitting operation by the one-side pressing mechanism and the other-side pressing mechanism; and
   a storing structure that stores a plurality of press-fitting tools or the backup tool to be used by the one-side pressing mechanism or the other-side pressing mechanism, wherein
   the press-fitting controller includes:
      a stroke-amount manipulating device that Manipulates the Stroke amounts of the press-fitting tool and the backup tool in the press-fitting direction such that current values of the stroke amounts accord with necessary values of the stroke amounts, according to a result of a comparison of the current values with the necessary values;
      a displacement amount storage that outputs displacement amounts of the one-side pressing mechanism and the other-side pressing mechanism in the press-fitting direction, at the time of the press-fitting operation; and
      a correction device that corrects, based on the displacement amounts output from the displacement amount storage, at least one of the current values of the stroke amounts and the necessary values of the stroke amounts to be compared in the stroke-amount manipulating device in terms of the stroke amounts of the press-fitting tool and the back-up tool in the press-fitting direction, each of the one-side pressing mechanism and the other-side pressing mechanism includes an adapter that pips the press-fitting tool or the backup tool, each of the press-fitting tool and the backup tool includes:
- a lock that takes a retracting position that allows movement of the adapter between a non-grip position and a grip position, and a projection position that does not allow the movement of the adapter between the non-grip position and the grip position:
- an inside structure including an inside recess that allows the lock to be positioned at the retracting position, and a large diameter structure that does not allow the lock to be positioned at the retracting position; and
- a biasing mechanism that biases the inside structure such that the large diameter structure faces the lock, the storing structure has a push-back shape so as to push back the inside structure of the press-fitting tool or the backup tool stored in the storing structure, against biasing of the biasing mechanism such that the inside recess faces the lock, and the storing structure, the press-fitting tool and the backup tool form a prohibition shape that prohibits the press-fitting tool or the backup tool stored in the storing structure from moving in a biased direction by the biasing mechanism.

5. The press-fitting device according to claim 4, wherein the displacement amount storage stores the displacement amounts found in advance per a press-fitting position and per a load value in the press-fitting direction, and outputs a corresponding displacement amount based on information of the press-fitting position and information of a current load value.

6. The press-fitting device according to claim 3, wherein the displacement amount storage stores the displacement amounts found in advance per a press-fitting position and per a load value in the press-fitting direction, and outputs a corresponding displacement amount based on information of the press-fitting position and information of a current load value.

* * * * *